US012657789B2

(12) United States Patent
Bao et al.

(10) Patent No.: US 12,657,789 B2
(45) Date of Patent: Jun. 16, 2026

(54) DATA PROCESSING METHOD AND RELATED APPARATUS

(71) Applicant: Honor Device Co., Ltd., Shenzhen (CN)

(72) Inventors: Zhixue Bao, Shenzhen (CN); Wenyong Sun, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 125 days.

(21) Appl. No.: 18/840,846

(22) PCT Filed: Sep. 22, 2023

(86) PCT No.: PCT/CN2023/120777
§ 371 (c)(1),
(2) Date: Aug. 22, 2024

(87) PCT Pub. No.: WO2024/087970
PCT Pub. Date: May 2, 2024

(65) Prior Publication Data
US 2025/0182349 A1      Jun. 5, 2025

(30) Foreign Application Priority Data

Oct. 26, 2022    (CN) .......................... 202211318725.6

(51) Int. Cl.
*G06T 11/00*          (2026.01)
*G06F 3/00*          (2006.01)
(Continued)

(52) U.S. Cl.
CPC .......... *G06T 11/23* (2026.01); *G06F 3/04883* (2013.01); *G06F 3/14* (2013.01)

(58) Field of Classification Search
None
See application file for complete search history.

(56) References Cited

U.S. PATENT DOCUMENTS

2022/0358894 A1* 11/2022 Wang .................... G06T 15/503
2022/0415282 A1* 12/2022 Li ........................ G06F 3/04186
(Continued)

FOREIGN PATENT DOCUMENTS

CN          101119489 A          2/2008
CN          109753262 A          5/2019
(Continued)

*Primary Examiner* — Zhihan Zhou
(74) *Attorney, Agent, or Firm* — Slater Matsil, LLP

(57) ABSTRACT

Embodiments of this application provide a data processing method and a related apparatus. The method includes: obtaining an input event corresponding to the sliding operation; drawing and rendering an $N^{th}$ frame based on a first move event, where the first move event is extracted based on a timestamp of a first Vsync signal and from the input event corresponding to the sliding operation; displaying the $N^{th}$ frame; drawing and rendering, when duration of the drawing and the rendering of the $N^{th}$ frame is greater than a Vsync periodicity, an $(N+1)^{th}$ frame based on a second move event after the drawing and the rendering of the $N^{th}$ frame are completed, where the second move event is extracted based on a first timestamp and from the input event corresponding to the sliding operation, and the first timestamp is a sum of the timestamp of the first Vsync signal and the Vsync periodicity.

9 Claims, 17 Drawing Sheets

(51) Int. Cl.
| | | |
|---|---|---|
| *G06F 3/04883* | (2022.01) | |
| *G06F 3/14* | (2006.01) | |
| *G06T 11/23* | (2026.01) | |

(56) References Cited

U.S. PATENT DOCUMENTS

| 2023/0116975 | A1* | 4/2023 | Chen | G06F 9/451 |
|---|---|---|---|---|
| | | | | 345/629 |
| 2024/0021176 | A1* | 1/2024 | Chen | G09G 5/377 |
| 2024/0061569 | A1* | 2/2024 | Chen | G06F 1/3265 |

FOREIGN PATENT DOCUMENTS

| CN | 110503708 | A | 11/2019 | |
|---|---|---|---|---|
| CN | 110609645 | A | 12/2019 | |
| CN | 113096054 | A | 7/2021 | |
| CN | 114092595 | A | 2/2022 | |
| CN | 114327127 | A | 4/2022 | |
| CN | 114338952 | A | 4/2022 | |
| CN | 114764357 | A | 7/2022 | |
| WO | WO-2022021895 | A1* | 2/2022 | G06T 11/40 |

* cited by examiner

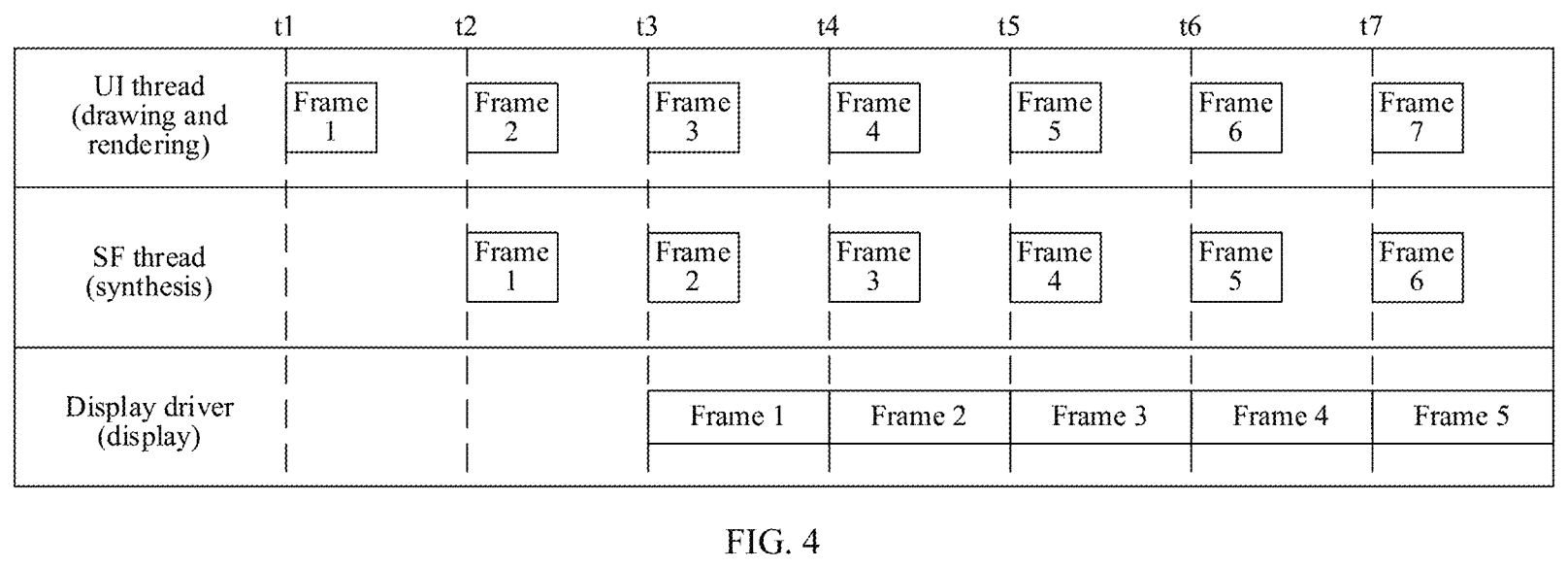

| | t1 | t2 | t3 | t4 | t5 | t6 | t7 |
|---|---|---|---|---|---|---|---|
| UI thread (drawing and rendering) | Frame 1 | Frame 2 | Frame 3 | Frame 4 | Frame 5 | Frame 6 | Frame 7 |
| SF thread (synthesis) | | Frame 1 | Frame 2 | Frame 3 | Frame 4 | Frame 5 | Frame 6 |
| Display driver (display) | | | Frame 1 | Frame 2 | Frame 3 | Frame 4 | Frame 5 |

FIG. 4

DATA PROCESSING METHOD AND RELATED APPARATUS

CROSS-REFERENCE TO RELATED APPLICATIONS

This application is a National Stage of International Application No. PCT/CN2023/120777, filed on Sep. 22, 2023, which claims priority to Chinese Patent Application No. 202211318725.6, filed on Oct. 26, 2022, both of which are hereby incorporated by reference in their entireties.

TECHNICAL FIELD

This application relates to the field of terminal technologies, and in particular, to a data processing method and a related apparatus.

BACKGROUND

Currently, a user may view various types of content through a display screen of a terminal device. When there is much content, the display screen cannot display all the content at a time. The terminal device may control, in response to a sliding operation of the user on the display screen, the displayed content to slide with a hand or without following the hand, to facilitate browsing related content by the user.

Interface display on the display screen of the terminal device generally needs to go through processes such as drawing, rendering, and synthesis. For example, an interface drawing process of the terminal device may include processes such as background drawing, subview drawing, and scroll bar drawing. An interface synthesis process of the terminal device may include processing processes such as vertex processing and pixel processing.

However, when the terminal device expires during drawing, an anomaly such as a display freeze or a jump may occur.

SUMMARY

Embodiments of this application provide a data processing method and a related apparatus, applied to the field of terminal technologies. In a scenario that drawing and rendering expire, a lost frame caused by expiration of drawing and rendering is compensated through frame interpolation, to improve display smoothness.

According to a first aspect, an embodiment of this application provides a data processing method. The method includes: In response to a sliding operation, a terminal device obtains an input event corresponding to the sliding operation; the terminal device draws and renders an $N^{th}$ frame based on a first move event, where the first move event is extracted based on a timestamp of a first Vsync signal and from the input event corresponding to the sliding operation; the terminal device displays the $N^{th}$ frame; the terminal device draws and renders, when duration of the drawing and the rendering of the $N^{th}$ frame is greater than a Vsync periodicity, an $(N+1)^{th}$ frame based on a second move event after the drawing and the rendering of the $N^{th}$ frame are completed, where the second move event is extracted based on a first timestamp and from the input event corresponding to the sliding operation, and the first timestamp is a sum of the timestamp of the first Vsync signal and the Vsync periodicity; and the terminal device displays the $(N+1)^{th}$ frame.

In this way, a lost frame caused by expiration of drawing and rendering is compensated through frame interpolation, to improve display smoothness.

Optionally, that the terminal device draws and renders, when duration of the drawing and the rendering of the $N^{th}$ frame is greater than a Vsync periodicity, an $(N+1)^{th}$ frame based on a second move event after the drawing and the rendering of the $N^{th}$ frame are completed includes: A UI thread of the terminal device sends a Vsync signal request to an SF thread of the terminal device at a first moment, where the first moment is later than the timestamp of the first Vsync signal; and the terminal device draws and renders, when a first value is greater than the Vsync periodicity, the $(N+1)^{th}$ frame based on the second move event after the drawing and the rendering of the $N^{th}$ frame are completed, where the first value is a difference of the first moment and the timestamp of the first Vsync signal.

In this way, the duration of the drawing and the rendering of the $N^{th}$ frame is determined by using time of the Vsync signal request, so that a lost frame caused by a late Vsync signal request is compensated, to improve the display smoothness.

Optionally, that the terminal device draws and renders, when a first value is greater than the Vsync periodicity, the $(N+1)^{th}$ frame based on the second move event after the drawing of the $N^{th}$ frame is completed includes: A frame interpolation module of the terminal device sends the first timestamp to the UI thread when the first value is greater than the Vsync periodicity; the UI thread reads the second move event from an input thread of the terminal device based on the first timestamp; and the UI thread draws and renders, after the drawing and the rendering of the $N^{th}$ frame are completed, the $(N+1)^{th}$ frame based on the second move event.

In this way, the first timestamp is determined by using the frame interpolation module, to facilitate the UI thread in subsequently determining the second move event and drawing and rendering the $(N+1)^{th}$ frame.

Optionally, that the terminal device draws and renders, when a first value is greater than the Vsync periodicity, the $(N+1)^{th}$ frame based on the second move event when the drawing of the $N^{th}$ frame is completed includes: A frame interpolation module of the terminal device reads, when the first value is greater than the Vsync periodicity, the second move event from an input thread of the terminal device based on the first moment; the frame interpolation module sends the second move event to the UI thread; and the UI thread draws and renders, after the drawing of the $N^{th}$ frame is completed, the $(N+1)^{th}$ frame based on the second move event.

In this way, the second move event is determined by using the frame interpolation module, to facilitate the UI thread in subsequently drawing and rendering the $(N+1)^{th}$ frame.

Optionally, the method further includes: An input event determined by the terminal device based on a timestamp of a second Vsync signal being a down event, where the timestamp of the second Vsync signal is earlier than the timestamp of the first Vsync signal; the terminal device draws and renders an $M^{th}$ frame based on a third move event, where the third move event is extracted based on a timestamp of a third Vsync signal and from the input event corresponding to the sliding operation, the timestamp of the third Vsync signal is one Vsync periodicity later than the timestamp of the second Vsync signal, and the timestamp of the third Vsync signal is earlier than or equal to the timestamp of the first Vsync signal; the terminal device displays the $M^{th}$ frame; the terminal device starts to draw and render a frame interpolation image after the drawing of the $M^{th}$ frame is completed, where an offset between coordinates corresponding to the frame interpolation image and coordinates corresponding to the $M^{th}$ frame is less than or equal to a second value, and the second value is an offset between the coordinates corresponding to the $M^{th}$ frame and coordinates corresponding to an $(M-1)^{th}$ frame; and the terminal device displays the frame interpolation image.

In this way, at an initial stage of the sliding operation, a frame is interpolated for drawing and rendering, so that one more frame is buffered in a queue buffer. Therefore, a case in which no frame is for synthesis and that is caused by subsequent expiration of drawing and rendering can be reduced, to reduce a display freeze, and improve user experience.

Optionally, the offset between the coordinates corresponding to the frame interpolation image and the coordinates corresponding to the $M^{th}$ frame is equal to the second value when the offset between the coordinates corresponding to the $M^{th}$ frame and the coordinates corresponding to the $(M-1)^{th}$ frame is less than a first threshold; or the offset between the coordinates corresponding to the frame interpolation image and the coordinates corresponding to the $M^{th}$ frame when the offset between the coordinates corresponding to the $M^{th}$ frame and the coordinates corresponding to the $(M-1)^{th}$ frame is greater than or equal to the first threshold.

In this way, a smaller offset is used for frame interpolation, so that a case that an interpolated image is inconsistent with a rule of the sliding operation can be reduced, to improve smoothness and improve user experience.

Optionally, that the terminal device starts to draw and render a frame interpolation image after the drawing of the $M^{th}$ frame is completed includes: The frame interpolation module determines, based on the down event and the second move event the offset between the coordinates corresponding to the frame interpolation image and the coordinates corresponding to the $M^{th}$ frame; the frame interpolation module sends the offset between the coordinates corresponding to the frame interpolation image and the coordinates corresponding to the $M^{th}$ frame to the UI thread; and the UI thread draws and renders, after the drawing of the $M^{th}$ frame is completed, the frame interpolation image based on the offset between the coordinates corresponding to the frame interpolation image and the coordinates corresponding to the $M^{th}$ frame.

In this way, a frame of image is interpolated when input events corresponding to two adjacent Vsync signals are respectively a down event and a move event, so that one more frame is buffered in a queue buffer. Therefore, a case in which no frame is for synthesis and that is caused by subsequent expiration of drawing and rendering can be reduced.

According to a second aspect, an embodiment of this application provides a terminal device. The terminal device may also be referred to as a terminal (terminal), user equipment (user equipment, UE), a mobile station (mobile station, MS), a mobile terminal (mobile terminal, MT), or the like. The terminal device may be a mobile phone (mobile phone), a smart TV, a wearable device, a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

The terminal device includes: a processor and a memory. The memory stores computer-executable instructions. The processor executes the computer-executable instructions stored in the memory, to enable the terminal device to perform the method in the first aspect.

According to a third aspect, an embodiment of this application provides a computer-readable storage medium, storing a computer program. When the computer program is executed by a processor, the method in the first aspect is implemented.

According to a fourth aspect, an embodiment of this application provides a computer program product, including a computer program. When the computer program is run, a computer is enabled to perform the method in the first aspect.

According to a fifth aspect, an embodiment of this application provides a chip, including a processor, the processor being configured to invoke a computer program stored in a memory, to perform the method in the first aspect.

It should be understood that the second aspect to the fifth aspect of this application correspond to the technical solution of the first aspect of this application, and the beneficial effects obtained by each aspect and the corresponding feasible implementations are similar. Details are not described herein again.

BRIEF DESCRIPTION OF THE DRAWINGS

FIG. 4 is a schematic diagram of an interface display processing procedure of a terminal device in a possible design;

DETAILED DESCRIPTION OF ILLUSTRATIVE EMBODIMENTS

Figure 1:
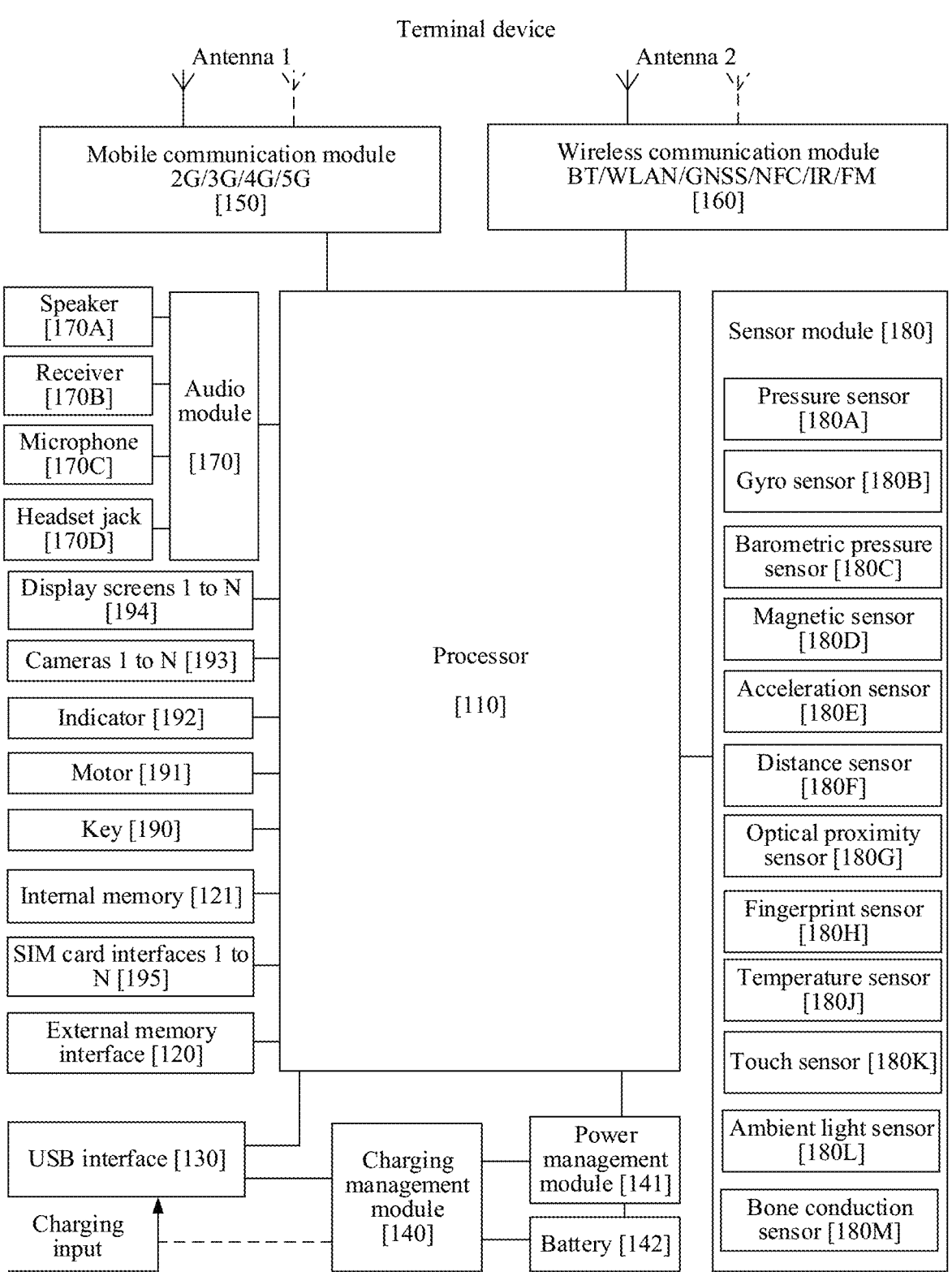
FIG. 1 is a schematic diagram of a hardware structure of a terminal device according to an embodiment of this application.

For ease of clearly describing technical solutions in embodiments of this application, some terms and technologies involved in the embodiments of this application are briefly introduced below.

1. Frame: It is a single picture of a smallest unit in interface display. A frame may be understood as a still picture, and a plurality of consecutive frames displayed quickly and continuously may produce an illusion of object motion. A frame rate is a quantity of frames of an image refreshed in one second, or may be understood as a quantity of times of refreshing a picture every second by a graphics processing unit in a terminal device. A smooth and vivid animation may be obtained with a high frame rate. The greater the quantity of frames every second, the smoother a displayed action is.

It is to be noted that, before an interface displays a frame, processes such as drawing, rendering, and synthesis generally need to be gone through.

2. Frame drawing: It is image drawing of a display interface. The display interface may be formed by one or more views. Each view may be drawn by a visible control of a view system. Each view is formed by subviews. A subview corresponds to a small component in the view. For example, a subview corresponds to a symbol in an image view.

3. Frame rendering: It is to perform a coloring operation on a drawn view, adding a 3D effect, or the like. For example, the 3D effect may be a lighting effect, a shadow effect, a texture effect, or the like.

4. Frame synthesis: It is a process of synthesizing a plurality of the foregoing one or more rendered views into a display interface.

5. Vertical synchronization (Vertical synchronization, Vsync) signal: It is a signal for controlling a start of a process such as drawing and rendering, synthesis, or display of a frame.

A Vsync signal is a periodic signal, and a Vsync signal periodicity may be set according to a screen refresh rate. For example, when the screen refresh rate is 60 Hz, the Vsync signal periodicity may be 16.6 ms. In other words, a terminal device generates a control signal every 16.6 ms to periodically trigger the Vsync signal. To ensure display smoothness and avoid a phenomenon such as a display freeze, the terminal device generally performs displaying based on the Vsync signal, to synchronize image procedures such as drawing, rendering, synthesis, and screen refreshing display.

The Vsync signal includes software Vsync (Vsync-APP or Vsync-SF) and hardware Vsync (Vsync-HW). The Vsync-APP is for triggering the drawing and rendering procedures. The Vsync-SF is for triggering the synthesis procedure. The hardware Vsync signal (Vsync-HW) is for triggering the screen refreshing display procedure. Generally, the software Vsync and the hardware Vsync maintain periodicity synchronization. A change of 60 Hz and 120 Hz is used as an example. If the Vsync-HW is switched from 60 Hz to 120 Hz, the Vsync-APP and the Vsync-SF synchronously change and are switched from 60 Hz to 120 Hz.

6. Other Terms

In the embodiments of this application, words such as "first" and "second" are used to distinguish same or similar items with basically same functions and roles. For example, a first chip and a second chip are merely used to distinguish between different chips, and are not intended to limit a sequence thereof. A person skilled in the art may understand that the words such as "first" and "second" do not limit a quantity and an execution order, and the words such as "first" and "second" are not limited to be necessarily different.

It is to be noted that, in the embodiments of this application, a word such as "exemplary" or "for example" is used to represent giving an example, an illustration, or a description. Any embodiment or design scheme described as an "exemplary" or "for example" in this application should not be explained as being more preferred or having more advantages than another embodiment or design scheme. Exactly, use of the word such as "exemplary" or "example" is intended to present a related concept in a specific manner.

In the embodiments of this application, "at least one" refers to one or more, and "a plurality of" refers to two or more. "And/or" describes an association relationship for describing associated objects and represents that three relationships may exist. For example, A and/or B may represent that: only A exists, both A and B exist, and only B exists, where A and B may be singular or plural. The character "/" generally indicates an "or" relationship between the associated objects. "At least one of the following" or a similar expression thereof refers to any combination of these items, including one item or any combination of a plurality of items. For example, at least one of a, b, or c may represent a, b, c, "a and b", "a and c", "b and c", or "a, b, and c", where a, b, and c may be singular or plural.

7. Terminal Device

A terminal device in the embodiments of this application may also be an electronic device in any form. For example, the electronic device may include a handheld device with a graphics processing function, an in-vehicle device, or the like. For example, some electronic devices are as follows: a mobile phone (mobile phone), a tablet computer, a palmtop computer, a notebook computer, a mobile Internet device (mobile Internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in smart grid (smart grid), a wireless terminal in transportation safety (transportation safety), a wireless terminal in smart city (smart city), a wireless terminal in smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, an in-vehicle device, the wearable device, a terminal device in a 5G network, a terminal device in a future evolved public land mobile network (public land mobile network, PLMN), and the like. This is not limited in the embodiments of this application.

By way of example but not limitation, in this embodiment of this application, the terminal device may also be a wearable device. The wearable device may also be referred to as a wearable intelligent device, and is a general term of wearable devices, such as glasses, gloves, a watch, clothes, and shoes, that are developed by applying a wearable technology to intelligent design of daily wear. The wearable device is a portable device that is directly worn on a body or integrated into clothes or an accessory of a user. The wearable device is not merely a hardware device, but is used to implement a powerful function through software support, data interaction, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bracelets or smart jewelry for monitoring physical signs.

In addition, in the embodiments of this application, the terminal device may also be a terminal device in an Internet of Things (Internet of Things, IoT) system. IoT is an important part in future development of information technologies, and a main technical feature thereof is connecting a thing to a network through a communication technology, to implement an intelligent network of human-machine interconnection and interconnection between things.

The electronic device in the embodiments of this application may alternatively be referred to as: a terminal device, user equipment (user equipment, UE), a mobile station (mobile station, MS), a mobile terminal (mobile terminal, MT), an access terminal, a user unit, a user station, a mobile site, the mobile station, a remote station, a remote terminal, a mobile device, a user terminal, a terminal, a wireless communication device, a user agent, or a user apparatus.

In the embodiments of this application, the electronic device or each network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (which is also referred to as a main memory). An operating system may be any one or more computer operating systems for implementing service processing through a process (process), for example, a Linux operating system, a Unix operating system, an Android operating system, an iOS operating system, or a Windows operating system. The application layer includes applications such as a browser, an address book, word processing software, and instant messaging software.

For example, FIG. 1 is a schematic diagram of a structure of a terminal device.

The terminal device may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in the embodiments of this application does not constitute a specific limitation on the terminal device. In some other embodiments of this application, the terminal device may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal according to instruction operation code and a sequence signal, to complete control of fetching and executing instructions.

A memory may be further disposed in the processor 110, and is configured to store instructions and data. In some embodiments, the memory in the processor 110 is a cache memory. The memory may store instructions or data that has just been used or recycled by the processor 110. If the processor 110 needs to use the instructions or the data again, the processor may directly invoke the instructions or the data from the foregoing memory, which avoids repeated access, and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

It may be understood that an interface connection relationship between the modules illustrated in the embodiments of this application is merely an example for description, and does not constitute a limitation on a structure of the terminal device. In some other embodiments of this application, the terminal device may alternatively use an interface connection manner different from that in the foregoing embodiment, or use a combination of a plurality of interface connection manners.

The terminal device implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render a graphic. The processor 110 may include one or more GPUs, and execute program instructions to generate or change display information.

The terminal device may implement a photographing function by using the ISP, the camera 193, the video codec, the GPU, the display screen 194, the application processor, and the like.

The external memory interface 120 may be configured to connect to an external storage card such as a micro SD card, to extend a storage capability of the terminal device. The external storage card communicates with the processor 110 by using the external memory interface 120, to implement a data storage function, for example, storing a file such as a music or a video in the external storage card.

The internal memory 121 may be configured to store computer executable program code, where the executable program code includes instructions. The internal memory 121 may include a program storage area and a data storage area. The program storage area may store an operating system, an application required by at least one function (for example, a sound playing function or an image playing function), and the like. The data storage area may store data (such as audio data and an address book) created during use of the terminal device, and the like. In addition, the internal memory 121 may include a high-speed random access memory, or may include a non-volatile memory such as at least one magnetic disk memory, a flash memory, or a universal flash storage (universal flash storage, UFS). The processor 110 executes various functional applications and data processing of the terminal device by running instructions stored in the internal memory 121 and/or instructions stored in the memory disposed in the processor. For example, the processor may perform a data processing method according to the embodiments of this application.

A software system of the terminal device may use a layered architecture, an event-driven architecture, a micro-kernel architecture, a micro service architecture, or a cloud architecture. In the embodiments of this application, an Android system of a layered architecture is used as an example to exemplarily describe a software structure of the terminal device.

Figure 2:
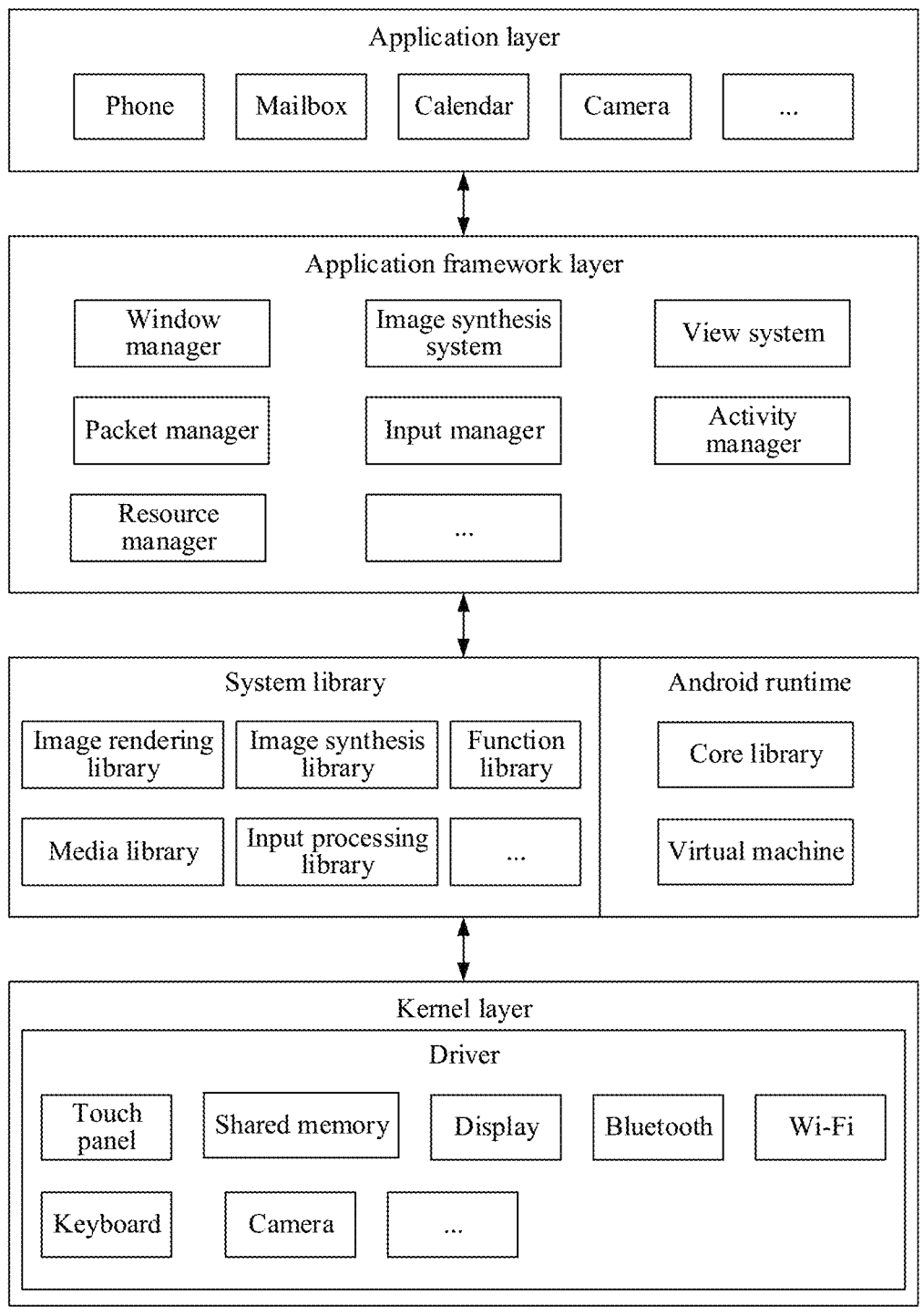
FIG. 2 is a schematic diagram of a software structure of a terminal device according to an embodiment of this application.
Figures 3A, 3B, 3C:
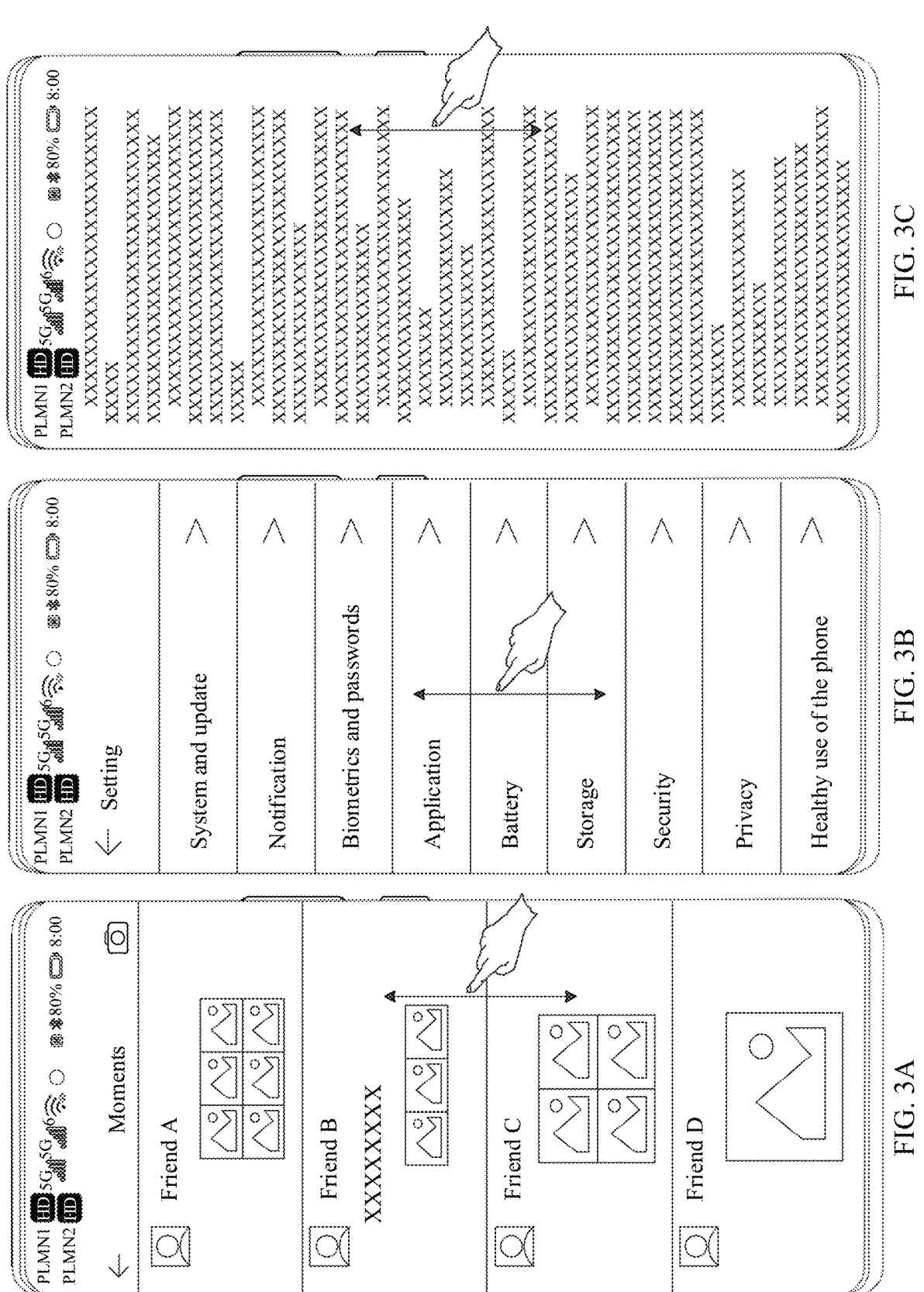
FIG. 3A to FIG. 3F are schematic diagrams of interfaces of a terminal device according to an embodiment of this application.
Figures 3D, 3E, 3F:
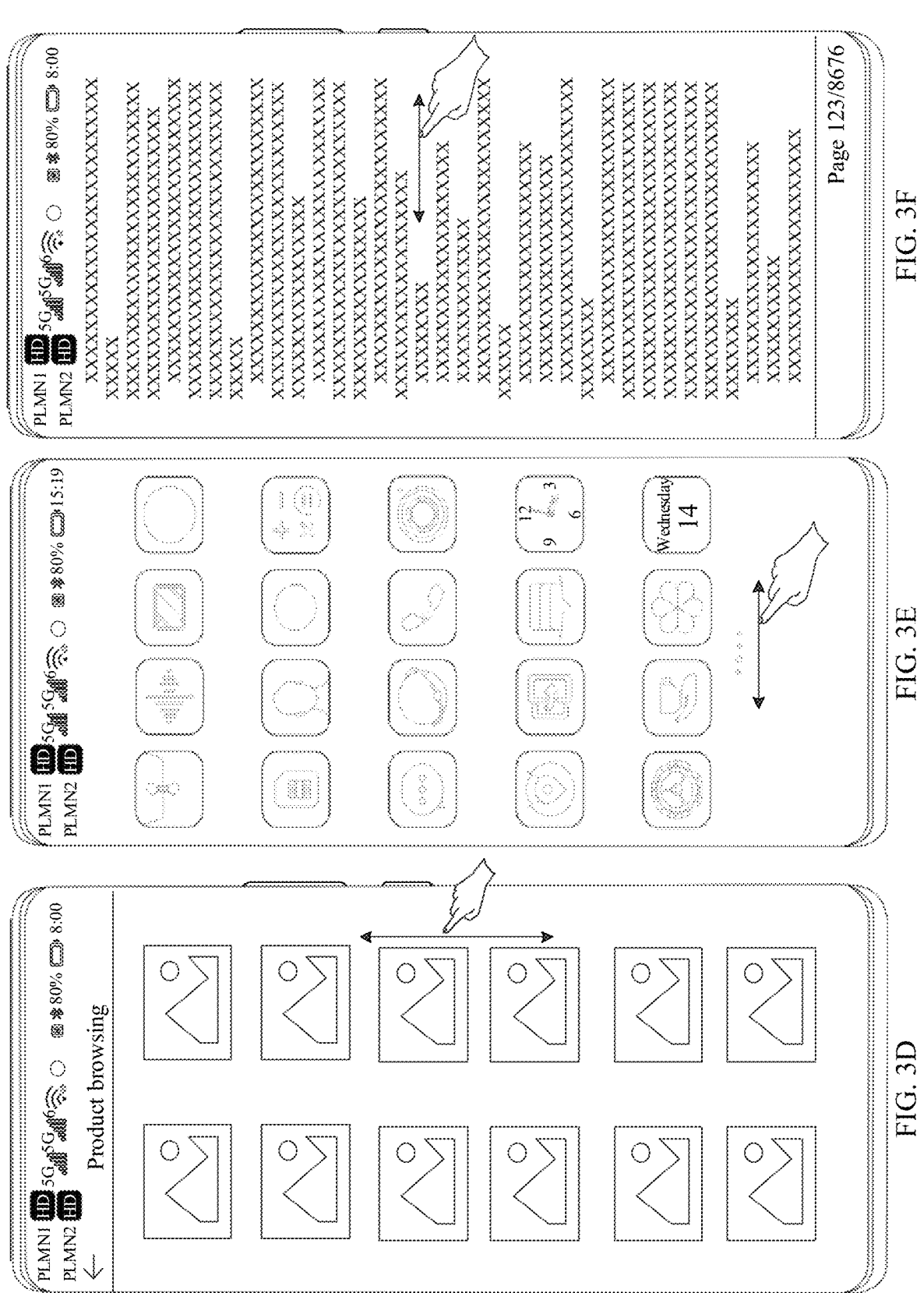

FIG. 2 is a block diagram of a software structure of a terminal device according to an embodiment of this application. In a layered architecture, software is divided into several layers, and each layer has a clear role and task. The layers communicate with each other through a software interface. In some embodiments, an Android system may be divided into four layers that are respectively an application (applications) layer, an application framework (application framework) layer, an Android runtime (Android runtime) and system library, and a kernel (kernel) layer.

The application layer may include a series of application packages. The application layer invokes an application programming interface (application programming interface, API) provided by the application framework layer to run an application. As shown in FIG. 2, the application package may include applications such as phone, mailbox, calendar, and camera.

As shown in FIG. 2, the application framework layer may include a window manager, surface flinger (an image synthesis system or an SF thread), a view system, a package manager, an input manager, an activity manager, a resource manager, and the like.

The window manager is configured to manage a window program. The window manager may obtain a size of a display screen, determine whether there is a status bar, lock a screen, capture a screen, and the like.

The SF thread is configured to control image synthesis, and generate a vertical synchronization (vertical synchronization, Vsync) signal.

For example, the SF thread includes: a synthesis thread, a Vsync thread, a queue buffer (queue buffer) thread. The synthesis thread is configured to be woken by the Vsync signal for synthesis. The Vsync thread is configured to generate a next Vsync signal according to a Vsync signal request. The queue buffer thread is configured to store a buffer, generate the Vsync signal request, wake the synthesis thread, and the like.

The view system includes visual controls such as a control for displaying text and a control for displaying an image. The view system may be configured to construct an application. A display interface may include one or more views. For example, a display interface including a short message service notification icon may include a view for displaying text and a view for displaying an image.

The package manager is configured for program management, such as application installation, uninstallation, and upgrade, in a system.

The input manager is configured to manage a program of an input device. For example, the input manager may determine input operations such as a mouse clicking operation, a keyboard input operation, and a touch swiping operation.

The activity manager is configured to manage a lifecycle of each application and a navigation back function. The activity manager is responsible for constructing a main thread of the Android, and maintenance of the lifecycle of each application.

The resource manager provides various resources such as a localized character string, an icon, an image, a layout file, and a video file for an application.

The Android runtime includes a core library and a virtual machine. The Android runtime is responsible for scheduling and managing an Android system.

The core library includes two parts: One part is a performance function that a java language needs to invoke, and the other part is a core library of Android.

The application layer and the application framework layer are run in a virtual machine. The virtual machine executes java files of the application layer and the application framework layer as binary files. The virtual machine is configured to execute functions such as object lifecycle management, stack management, thread management, security and exception management, and garbage collection.

The system library may include a plurality of functional modules, such as an image rendering library, an image synthesis library, a function library, a media library, and an input processing library.

The image rendering library is configured for rendering of a two-dimensional image or a three-dimensional image. The image synthesis library is configured for synthesis of a two-dimensional image or a three-dimensional image.

In a possible implementation, an application draws and renders an image by using the image rendering library, and then the application sends a drawn and rendered image to the queue buffer thread of the SF thread. Each time the Vsync signal arrives, the SF thread sequentially obtains a to-be-synthesized frame of image from the queue buffer, and then performs image synthesis by using the image synthesis library.

The function library provides a macro, a type definition, a string operation function, a mathematical calculation function, an input and output function, and the like used in a C language.

The media library supports playback and recording in a plurality of common audio and video formats, a static image file, and the like. The media library may support a plurality of audio and video encoding formats such as MPEG4, H.264, MP3, AAC, AMR, JPG, and PNG.

The input processing library is configured to process a library of the input device, and can implement mouse input processing, keyboard input processing, touch input processing, and the like.

The kernel layer is a layer between hardware and software. The kernel layer includes at least a touch panel (touch panel, TP) driver, a display driver, a Bluetooth driver, a Wi-Fi driver, a keyboard driver, a shared memory driver, a camera driver, and the like.

The hardware may be an audio device, a Bluetooth device, a camera device, a sensor device, or the like.

It is to be understood that, in some embodiments, a layer that implements a same function may be referred to as another name, or a layer that can implement functions of a plurality of layers may be used as one layer, or a layer that can implement functions of a plurality of layers may be divided into a plurality of layers. This is not limited in this embodiment of this application.

With reference to a scenario in which an application is enabled or interface switching occurs in the application, the following exemplarily describes a working procedure of software and hardware of a terminal device 100.

When the touch sensor 180K in a touch control panel receives a touch operation, the kernel layer processes the touch operation into an original input event (including information such as touch coordinates, touch strength, and a timestamp of the touch operation). The original input event is stored at the kernel layer. The kernel layer reports the original input event to the input manager of the application framework layer by using the input processing library. The input manager of the application framework layer parses information (including an operation type, a reporting location, and the like) of the original input event, determines a focus application according to a current focus, and sends parsed information to the focus application. A focus may be a touch point in the touch operation or a clicking location in the mouse clicking operation. The focus application is an application running in a foreground of the terminal device or an application corresponding to a touch location in the touch operation. The focus application determines a control corresponding to the original input event according to the parsed information (for example, the reporting position) of the original input event.

That the touch operation is a touch sliding operation, and a control corresponding to the touch sliding operation is a list control of a WeChat application is used as an example. The WeChat application invokes, by using the view system of the application framework layer, the image rendering library in the system library to draw and render an image. The WeChat application sends a drawn and rendered image to the queue buffer of the SF thread. The drawn and rendered image in the SF thread is synthesized into a WeChat interface by using the image synthesis library in the system library. The SF thread causes, by using the display driver of the kernel layer, a screen (the display screen) to display a corresponding interface of the WeChat application.

In some current scenarios, a user may perform a sliding operation on the display screen of the terminal device. In response to the sliding operation of the user, the terminal device may control displayed content to slide with or without following a hand.

For example, FIG. 3A to FIG. 3F are schematic diagrams of interfaces of a terminal device according to an embodiment of this application. As shown in FIG. 3A to FIG. 3D, the terminal device may display an interface of a social application shown in FIG. 3A, a setting-related interface shown in FIG. 3B, a file interface shown in FIG. 3C, and a product scanning interface shown in FIG. 3D. When these interfaces are displayed, the terminal device may respond to an upward sliding operation or a downward sliding operation of a user, to update display content. The terminal device may also display interfaces such as an interface shown in FIG. 3E and an electronic book interface shown in FIG. 3F. When displaying these interfaces, the terminal device may respond to a left sliding operation or a right sliding operation of the user, to update the display content. When the terminal device receives a sliding operation of the user at the interface shown in FIG. 3A to FIG. 3F, the terminal device may perform processes such as frame drawing, rendering, and synthesis based on the sliding operation, to update content displayed on a display screen.

It may be understood that, interface display on the display screen of the terminal device generally needs to go through processes such as drawing, rendering, and synthesis. For example, an interface drawing process of the terminal device may include processes such as background drawing, sub-view drawing, and scroll bar drawing. An interface synthesis process of the terminal device may include processing processes such as vertex processing and pixel processing.

However, if the terminal device expires (for example, exceeds one Vsync periodicity) during drawing and rendering an image (frame), an anomaly such as a display freeze or a jump may occur on the terminal device.

An interface display processing procedure of a terminal device is described below with reference to FIG. 4 and FIG. 5.

For example, FIG. 4 is a schematic diagram of an interface display processing procedure of a terminal device in a possible implementation. As shown in FIG. 4, a moment t1 to a moment t7 represent an image sequence for the terminal device to perform update based on a sliding operation. A time interval between any two adjacent moments of the moment t1 to the moment t7 is a Vsync periodicity. Each time a Vsync signal arrives, a UI thread starts to draw and render an image, an SF thread starts to synthesize an image, and a display driver drives a display screen to refresh a displayed image.

Specifically, display of a frame 1 is used as an example. If the Vsync signal arrives at the moment t1, the UI thread of the terminal device draws and renders the frame 1 by using a view system of an application framework layer. After the drawing and the rendering of the frame 1 are completed, the UI thread of the terminal device sends a completely drawn and rendered frame 1 to the SF thread. The SF thread synthesizes the completely drawn and rendered frame 1. After the frame 1 is synthesized, the terminal device may invoke a kernel layer to start the display driver, and display content corresponding to the frame 1 on a screen (the display screen). A frame 2 to a frame 7 are also synthesized and displayed in a process similar to the process for the frame 1, and details are not described herein again.

It is to be noted that, when drawing and rendering an image, the UI thread sends a Vsync signal request to the SF thread, to request a next Vsync signal for drawing and rendering. The SF thread arranges a timer for sending the Vsync signal. After timing of the timer ends, the SF thread feeds back the Vsync signal to the UI thread.

For example, when drawing and rendering the frame 1, the UI thread sends a Vsync signal request to the SF thread, to request, for drawing and rendering, a Vsync signal corresponding to a moment t2. After the timing ends, the SF thread feeds back the Vsync signal corresponding to the moment t2 to the UI thread.

In the display processing process shown in FIG. 4, drawing and rendering of the frame 1 to the frame 7 are all completed within one Vsync periodicity. However, during actual application of the terminal device, time for drawing and rendering the frame by the terminal device may increase due to a plurality of reasons such as a large system load (occupation by a central processing unit CPU, occupation by a graphics processing unit GPU, or the like) of the terminal device and a poor network, causing a lost frame. In addition, expiration of drawing and rendering may also cause the terminal device to have no frame available during synthesis, resulting in a display freeze. Descriptions are provided below with reference to FIG. 5.

Figure 5:
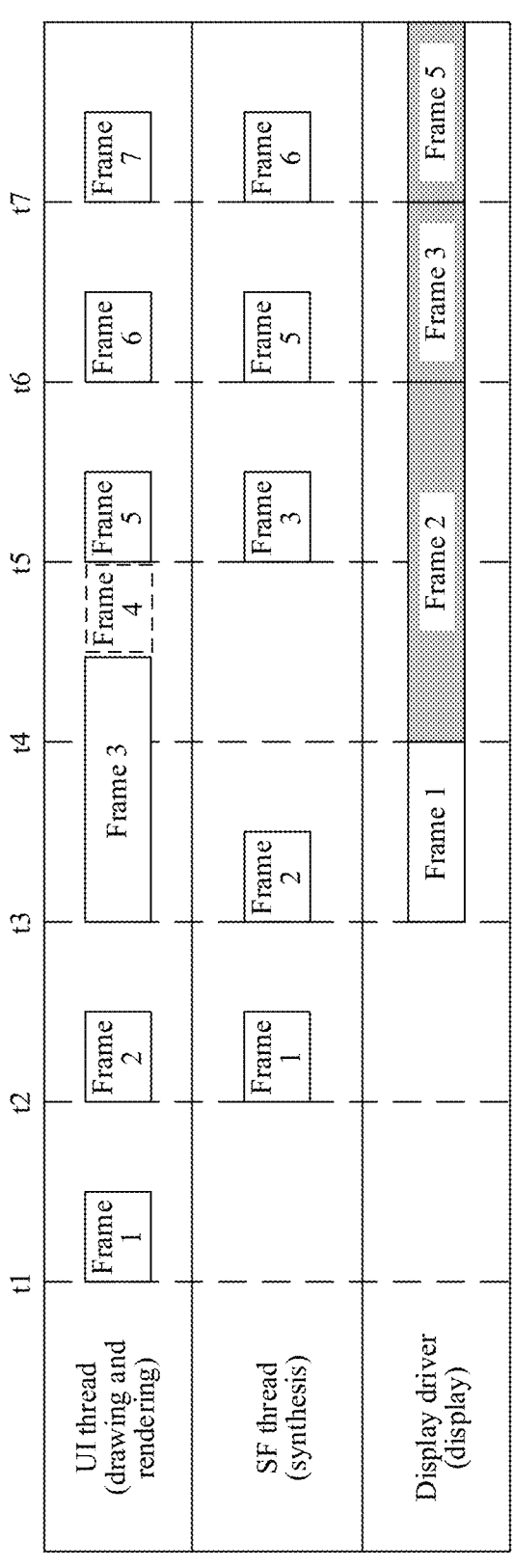
FIG. 5 is a schematic diagram of an interface display processing procedure of a terminal device in a possible design.

For example, FIG. 5 is a schematic diagram of an interface display processing procedure of a terminal device in a possible implementation. As shown in FIG. 5, a moment t1 to a moment t7 represent an image sequence for the terminal device to perform update based on a sliding operation. A time interval between any two adjacent moments of the moment t1 to the moment t7 is a Vsync periodicity.

In FIG. 5, when the terminal device receives the sliding operation of a user, content displayed by the terminal device sequentially corresponds to a frame 1, a frame 2, the frame 2, a frame 3, and a frame 5. The terminal device draws, renders, synthesizes, and displays the frame 1, the frame 2, the frame 3, the frame 5, a frame 6, and a frame 7 in FIG. 5 respectively. For details, refer to corresponding descriptions in FIG. 4.

Different from FIG. 4, due to various reasons, drawing and rendering duration of the frame 3 in FIG. 5 exceeds one Vsync periodicity. For example, the reason includes complexity of graphics drawing or fluctuation of a system load due to impact of data downloading and the like. At a moment t4, a UI thread continues to draw and render the frame 3. There is no to-be-synthesized image in an SF thread, and synthesis is not performed. A display driver drives a display screen to display the frame 2. At a moment t5, the UI thread in the terminal device starts to draw and render the frame 5, the SF thread starts to synthesize the frame 3, and the display driver drives the display screen to display the frame 2. At a moment t6, the UI thread in the terminal device starts to draw and render the frame 6, the SF thread starts to synthesize the frame 5, and the display driver drives the display screen to display the frame 3. At the moment t7, the UI thread in the terminal device starts to draw and render the frame 7, the SF thread starts to synthesize the frame 6, and the display driver drives the display screen to display the frame 5.

It may be understood that, in the procedure shown in FIG. 5, because the drawing and the rendering of the frame 3 are not completed at the moment t4, there is no to-be-synthesized image in the SF thread at the moment t4, and synthesis is not performed, so that display time of the frame 3 is delayed to the moment t6, and the terminal device displays the frame 2 from the moment t4 to the moment t6. In comparison with the procedure shown in FIG. 4, display duration of the frame 2 in the procedure shown in FIG. 5 is two Vsync periodicities, so that a picture freeze occurs.

In addition, in the procedure shown in FIG. 5, because the drawing and the rendering of the frame 3 are not completed at the moment t4, the UI thread continues to draw and render the frame 3, and drawing and rendering of the frame 4 are not performed. As a result, the frame 4 is not displayed subsequently, and a lost frame occurs.

In a possible design, when drawing and rendering an $N^{th}$ frame, the UI thread invokes a scheduleVsyncLocked function to send a Vsync signal request to the SF thread, to request a next Vsync signal. However, when the drawing of the $N^{th}$ frame expires, the scheduleVsyncLocked function is invoked late. As a result, the UI thread does not draw an $(N+1)^{th}$ frame because there is no VSync signal from the SF thread.

In the procedure shown in FIG. 5, the drawing and the rendering of the frame 3 expire, the UI thread does not send the Vsync signal request to the SF thread from the moment t3 to the moment t4, and the SF thread does not feed back a Vsync signal corresponding to the moment t4 to the UI thread. Consequently, the terminal device does not draw and render the frame 4, resulting in the lost frame.

It may be seen from FIG. 4 and FIG. 5 that, when the expiration of drawing and rendering occurs in the terminal device, there may be no available frame in the SF thread, causing a subsequent display freeze. In addition, when the expiration of drawing and rendering occurs in the terminal device, the Vsync signal may be missed, resulting in a lost frame, and further causing a picture jump and poor user experience.

It is to be noted that, during the sliding operation (for example, in a sliding scene in which a hand does not leave), generally, a case in which drawing and rendering of a plurality of consecutive frames expire does not occur. For example, a Moments interface in WeChat is used as an example. When an advertisement or a video in Moments is loaded for the first time, expiration of drawing and rendering may be caused.

In view of this, embodiments of this application provide a data processing method and a related apparatus. When sliding is started, a frame is interpolated for drawing and rendering and is buffered in a queue buffer. When the drawing expires, a frame is interpolated for drawing and rendering. In this way, when sliding is started, a frame is interpolated for drawing and rendering and is buffered in the queue buffer, thereby reducing a problem of no available frame due to long duration of drawing and rendering and reducing a freeze phenomenon. When the drawing and the rendering expire, a frame is interpolated for drawing and rendering, to reduce a lost frame caused by missing of the Vsync signal, and reduce a jump phenomenon during sliding.

The data processing method provided in embodiments of this application is described in detail below by using specific embodiments. The following embodiments may be combined with each other or independently implemented, and same or similar concepts or processes may not be repeatedly described in some embodiments.

Figure 6:
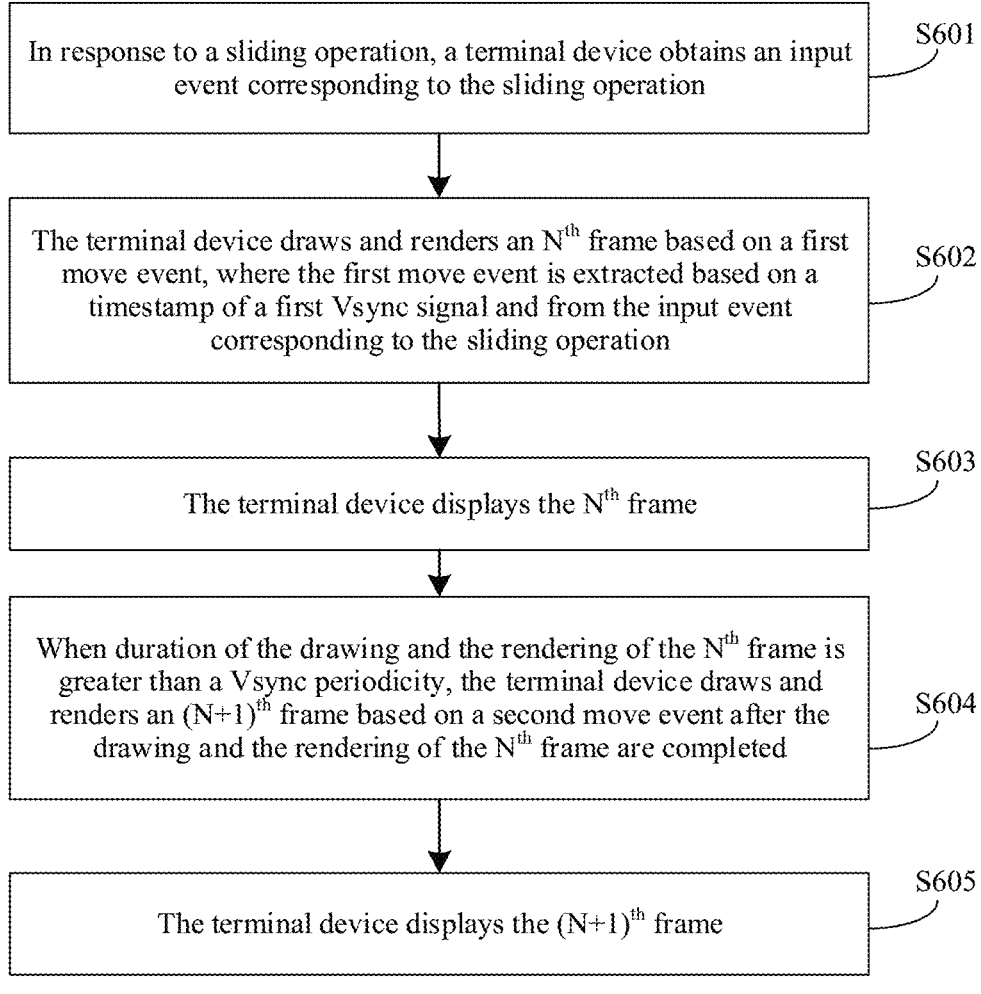
FIG. 6 is a schematic flowchart of a data processing method according to an embodiment of this application.

FIG. 6 is a schematic flowchart of a data processing method according to an embodiment of this application. As shown in FIG. 6, the method includes the following steps.

S601: In response to the sliding operation, a terminal device obtains an input event corresponding to the sliding operation.

It may be understood that, when the terminal device receives the sliding operation of a user, types of the input event corresponding to the sliding operation are down (down), move (move), and up (up). One sliding operation may include a down event, one or more move events, and an up event. It may also be understood that, the input event corresponding to the sliding operation includes: a down event, one or more move events, and an up event.

Specifically, when the terminal device receives the sliding operation, a display screen of the terminal device may collect the input event corresponding to the sliding operation, and report the input event to an input thread for recording.

S602: The terminal device draws and renders an $N^{th}$ frame based on a first move event, where the first move event is extracted based on a timestamp of a first Vsync signal and from the input event corresponding to the sliding operation.

In this embodiment of this application, the first Vsync signal may be any corresponding Vsync signal when a finger or the like of the user moves in the sliding operation. The first move event corresponds to the first Vsync signal.

It may be understood that, when the terminal device receives the sliding operation, the display screen may collect the input event corresponding to the sliding operation, and report the input event to the input thread. A UI thread may read the corresponding input event from the input thread based on the timestamp of the Vsync signal, to perform drawing and rendering and update content displayed on the display screen.

In this embodiment of this application, after receiving the Vsync signal, the UI thread reads based on the timestamp of the Vsync signal, and from the input event corresponding to the sliding operation and recorded by the input thread, to obtain the input event for drawing an image.

The first move event may be an input event corresponding to collecting of the sliding operation, or may be a new input event generated after an input event corresponding to collecting of the sliding operation is processed. Processing on the reported input event by the input thread is not limited in this embodiment of this application.

S603: The terminal device displays the $N^{th}$ frame.

S604: When duration of the drawing and the rendering of the $N^{th}$ frame is greater than a Vsync periodicity, the terminal device draws and renders an $(N+1)^{th}$ frame based on a second move event after the drawing and the rendering of the $N^{th}$ frame are completed.

In this embodiment of this application, the second move event is extracted based on a first timestamp and from the input event corresponding to the sliding operation. The first timestamp is later than the timestamp of the first Vsync signal, and the first timestamp is earlier than a timestamp of the $1^{st}$ Vsync signal received by the UI thread after the drawing and the rendering of the $N^{th}$ frame end.

Optionally, the first timestamp is a sum of the timestamp of the first Vsync signal and the Vsync periodicity.

In this way, a difference between a timestamp corresponding to an interpolated image and a timestamp corresponding to the $N^{th}$ frame of image is one Vsync periodicity, so that it is convenient for the terminal device to determine information about the interpolated image. Calculation is simple, and is easily implemented.

Figure 7:
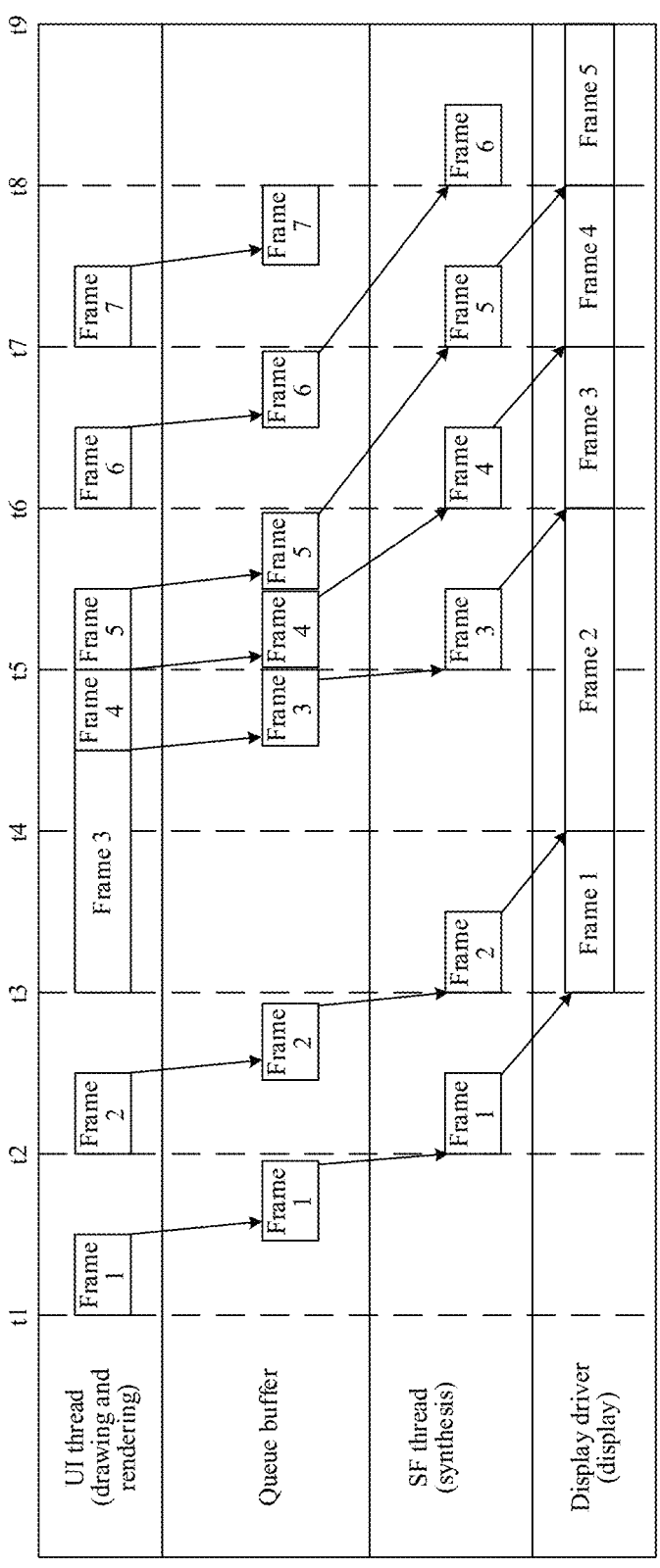
FIG. 7 is a schematic diagram of an interface display processing procedure of a terminal device according to an embodiment of this application.

For example, as shown in FIG. 7, if the UI thread sends a Vsync signal request to an SF thread from a moment t4 to a moment t5, a first value is greater than the Vsync periodicity. The terminal device starts to draw and render a $4^{th}$ frame after drawing and rendering of a $3^{rd}$ frame are completed. In this way, when the drawing and the rendering expire, a frame of image is interpolated, to reduce a lost frame caused by a late Vsync signal request, and improve display smoothness.

In some embodiments, whether the drawing and the rendering of the $N^{th}$ frame expire is determined by using time of the Vsync signal request. It may be understood that, when a frame of image is drawn and rendered, an application sends the Vsync signal request to the SF thread to draw and render a next frame of image. Therefore, after receiving the Vsync signal, if the application does not send the Vsync signal request within one Vsync periodicity, it may be determined that duration of the drawing and the rendering of the frame of image exceeds one Vsync periodicity.

S605: The terminal device displays the $(N+1)^{th}$ frame.

In conclusion, after the drawing and the rendering expire, a lost frame caused by expiration of drawing and rendering is compensated through frame interpolation, to improve the display smoothness.

Optionally, that when duration of the drawing and the rendering of the $N^{th}$ frame is greater than a Vsync periodicity, the terminal device draws and renders an $(N+1)^{th}$ frame based on a second move event after the drawing and the rendering of the $N^{th}$ frame are completed includes: A UI thread of the terminal device sends a Vsync signal request to an SF thread of the terminal device at a first moment, where the first moment is later than the timestamp of the first Vsync signal; and the terminal device draws and renders, when a first value is greater than the Vsync periodicity, the $(N+1)^{th}$ frame based on the second move event after the drawing and the rendering of the $N^{th}$ frame are completed, where the first value is a difference of the first moment and the timestamp of the first Vsync signal.

For example, as shown in FIG. 7, if the $N^{th}$ frame is a frame 3 in FIG. 7, the first moment may be any moment from the moment t4 to the moment t5.

Optionally, that the terminal device draws and renders, when a first value is greater than the Vsync periodicity, the $(N+1)^{th}$ frame based on the second move event after the drawing and the rendering of the $N^{th}$ frame are completed includes: A frame interpolation module of the terminal device sends the first timestamp to the UI thread when the first value is greater than the Vsync periodicity; the UI thread reads the second move event from an input thread of the terminal device based on the first timestamp; and the UI thread draws and renders, after the drawing and the rendering of the $N^{th}$ frame are completed, the $(N+1)^{th}$ frame based on the second move event.

In this way, the UI thread reads the second move event based on the first timestamp, to facilitate subsequent compensation of a lost frame caused by a late Vsync signal request.

Optionally, that the terminal device draws and renders, when a first value is greater than the Vsync periodicity, the $(N+1)^{th}$ frame based on the second move event after the drawing and the rendering of the $N^{th}$ frame are completed includes: A frame interpolation module of the terminal device reads the second move event from an input thread of the terminal device based on the first moment when the first value is greater than the Vsync periodicity; the frame interpolation module sends the second move event to the UI thread; and the UI thread draws and renders, after the drawing of the $N^{th}$ frame is completed, the $(N+1)^{th}$ frame based on the second move event.

In this way, the frame interpolation module reads the second move event based on the first timestamp, and sends the second move event to the UI thread, to compensate a lost frame caused by a late Vsync signal request.

The data processing method shown in FIG. 6 is described below with reference to FIG. 7. For example, FIG. 7 is a schematic diagram of an interface display processing procedure of a terminal device according to an embodiment of this application. A moment t1 to a moment t7 represent a time sequence for image update. A time interval between any two adjacent moments of the moment t1 to the moment ty is a Vsync periodicity.

When a finger of a user performs a sliding operation on a display screen, the display screen may report an input event corresponding to the sliding operation to an input thread, for a UI thread in an application to read the input event for image drawing, thereby updating an image.

As shown in FIG. 7, at the moment t1, the UI thread receives a Vsync 1 signal, and the terminal device reads a move event 1 based on a timestamp of the Vsync 1 signal and starts to draw and render a frame 1 based on coordinates corresponding to the move event 1.

From the moment t1 to a moment t2, the UI thread completes the drawing and the rendering of the frame 1, and sends a completely drawn and rendered frame 1 to a queue buffer in an SF thread to wait for synthesis.

At the moment t2, the UI thread receives a Vsync 2 signal, the terminal device reads a move event 2 based on a timestamp of the Vsync 2 signal and starts to draw and render a frame 2 based on coordinates corresponding to the move event 2, and the SF thread starts to synthesize the completely drawn and rendered frame 1.

From the moment t2 to a moment t3, the UI thread completes the drawing and the rendering of the frame 2, and sends a completely drawn and rendered frame 2 to the queue buffer in the SF thread to wait for synthesis.

At the moment t3, the UI thread receives a Vsync 3 signal, the terminal device reads a move event 3 based on a timestamp of the Vsync 3 signal and starts to draw and render a frame 3 based on coordinates corresponding to the move event 3, the SF thread starts to synthesize the completely drawn and rendered frame 2, and a display driver drives the display screen to display a synthesized frame 1.

At a moment t4, a UI thread continues to draw and render the frame 3. There is no to-be-synthesized frame in the queue buffer, and the SF thread does not perform the synthesis. The display driver drives the display screen to display a synthesized frame 2.

Because the drawing of the frame 3 is not completed before the moment t4 and a next VSync signal is not requested, a Vsync 4 signal is missed. The terminal device interpolates a frame 4 through frame interpolation, and starts to draw and render the frame 4 when the drawing and the rendering of the frame 3 end.

An input event is read based on a first timestamp, and the frame 4 is drawn and rendered based on a read move event 4. The first timestamp is later than the moment t3, and is earlier than time of sending a Vsync signal request by the UI thread.

From the moment t4 to a moment t5, the UI thread completes the drawing and the rendering of the frame 3 and the frame 4, and sends a completely drawn and rendered frame 3 and a completely drawn and rendered frame 4 to the queue buffer in the SF thread to wait for synthesis.

At the moment t5, the UI thread receives a Vsync 5 signal, the terminal device reads a move event 5 based on a timestamp of the Vsync 5 signal and starts to draw and render a frame 5 based on coordinates corresponding to the move event 5, the SF thread starts to synthesize the completely drawn and rendered frame 3, and the display driver drives the display screen to display the synthesized frame 2.

From the moment t5 to a moment t6, the UI thread completes the drawing and the rendering of the frame 5, and sends a completely drawn and rendered frame 5 to the queue buffer in the SF thread to wait for synthesis.

At the moment t6, the UI thread receives a Vsync 6 signal, the terminal device reads a move event 6 based on a timestamp of the Vsync 6 signal and starts to draw and render a frame 6 based on coordinates corresponding to the move event 6, the SF thread starts to synthesize the completely drawn and rendered frame 4, and the display driver drives the display screen to display a synthesized frame 3.

From the moment t6 to the moment t7, the UI thread completes the drawing and the rendering of the frame 6, and sends a completely drawn and rendered frame 6 to the queue buffer in the SF thread to wait for synthesis.

At the moment t7, the UI thread receives a Vsync 7 signal, the terminal device reads a move event 7 based on a timestamp of the Vsync 7 signal and starts to draw and render a frame 7 based on coordinates corresponding to the move event 7, the SF thread starts to synthesize the completely drawn and rendered frame 5, and the display driver drives the display screen to display a synthesized frame 4.

From the moment ty to a moment t8, the UI thread completes the drawing and the rendering of the frame 7, and sends a frame 7 at the moment t3 to the queue buffer in the SF thread to wait for synthesis.

At the moment t8, the UI thread receives the Vsync 7 signal, the SF thread starts to synthesize the frame 6, and the display driver drives the display screen to display the frame 5. In comparison with the processing procedure shown in FIG. 5, the frame 4 is interpolated through frame compensation when the drawing and the rendering of the frame 3 exceeds one Vsync periodicity in the processing procedure shown in FIG. 7. The frame 4 is further displayed before the frame 5 is displayed, so that a case in which displaying jumps from the frame 3 to the frame 5 is reduced, and display smoothness is improved.

Figure 8:
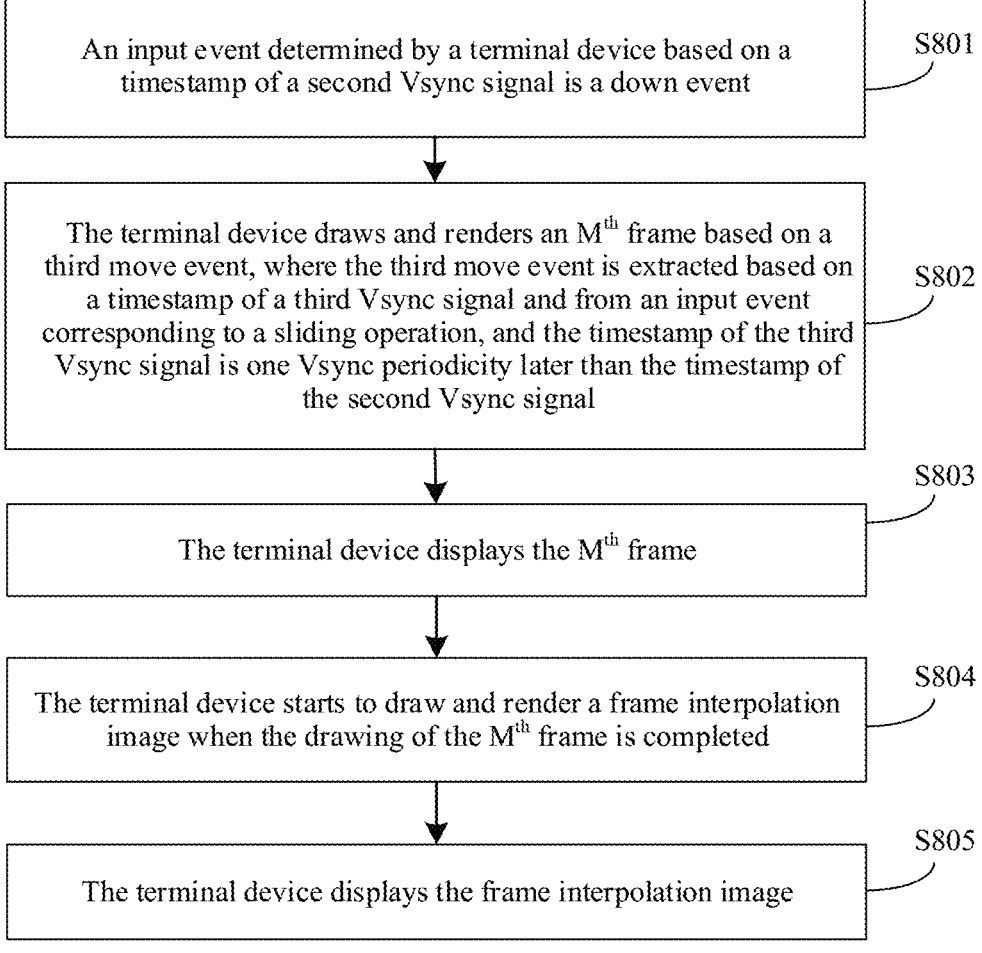
FIG. 8 is a schematic flowchart of a data processing method according to an embodiment of this application.

FIG. 8 is a schematic flowchart of a data processing method according to an embodiment of this application. As shown in FIG. 8, the method includes the following steps.

S801: An input event determined by a terminal device based on a timestamp of a second Vsync signal is a down event.

S802: The terminal device draws and renders an $M^{th}$ frame based on a third move event, where the third move event is obtained based on a timestamp of a third Vsync signal.

In this embodiment of this application, the timestamp of the third Vsync signal is one Vsync periodicity later than the timestamp of the second Vsync signal, and the timestamp of the third Vsync signal is earlier than or equal to a timestamp of a first Vsync signal. The third move event may also be understood as the $1^{st}$ move event in a sliding operation read by the terminal device.

It may be understood that, the terminal device performs frame interpolation when the terminal device determines that input events corresponding to two adjacent Vsync signals are respectively a down event and a move event.

S803: The terminal device displays the $M^{th}$ frame.

S804: The terminal device starts to draw and render a frame interpolation image when the drawing of the $M^{th}$ frame is completed.

In this embodiment of this application, an offset between coordinates corresponding to the frame interpolation image and coordinates corresponding to the $M^{th}$ frame is less than or equal to a second value, and the second value is an offset between the coordinates corresponding to the $M^{th}$ frame and coordinates corresponding to an $(M-1)^{th}$ frame.

An offset of the frame interpolation image relative to the $M^{th}$ frame is less than or equal to an offset of the $M^{th}$ frame relative to the $(M-1)^{th}$ frame, and the offset of the $M^{th}$ frame relative to the $(M-1)^{th}$ frame is related to coordinates corresponding to the third move event and coordinates corresponding to the down event.

In some embodiments, the offset may also be understood as a displacement amount. For example, a displacement amount of the frame interpolation image is a difference between the coordinates corresponding to the frame interpolation image and the coordinates corresponding to the $M^{th}$ frame.

In a possible implementation 1, a difference between the coordinates corresponding to the frame interpolation image and the coordinates corresponding to the third move event is equal to a first threshold.

The first threshold may be 10 pixels (px), or may be any other value. This is not limited in this embodiment of this application. In some embodiments, the first threshold is related to a use habit of a user, and the terminal device may determine the first threshold based on displacement values corresponding to a plurality of previous sliding operations of the user.

In this way, the offset of the frame interpolation image is limited, so that a rule that the interpolated image is inconsistent with the sliding operation can be reduced, to improve smoothness and improve user experience.

In a possible implementation 2, a difference between the coordinates corresponding to the frame interpolation image and the coordinates corresponding to the third move event is equal to a first displacement value, and the first displacement value is a difference between the coordinates corresponding to the third move event and the coordinates corresponding to the down event.

In this way, the offset of the frame interpolation image is limited to being the same as an offset of a previous frame of image, so that a rule that the interpolated image is inconsistent with the sliding operation can be reduced, to improve smoothness and improve user experience.

In a possible implementation 3, a difference between the coordinates corresponding to the frame interpolation image and the coordinates corresponding to the third move event is a minimum value between a first threshold and a first displacement value.

In this way, a smaller offset is used for frame interpolation, so that a rule that the interpolated image is inconsistent with the sliding operation can be reduced, to improve smoothness and improve user experience.

S805: The terminal device displays the frame interpolation image.

In conclusion, a frame is interpolated in advance for drawing and rendering, so that one more frame is buffered in a queue buffer. Therefore, a case in which no frame is for synthesis and that is caused by subsequent expiration of drawing and rendering is reduced, to reduce a display freeze and improve user experience.

Optionally, the offset between the coordinates corresponding to the frame interpolation image and the coordinates corresponding to the $M^{th}$ frame is equal to the second value when the offset between the coordinates corresponding to the $M^{th}$ frame and the coordinates corresponding to the $(M-1)^{th}$ frame is less than the first threshold; or the offset between the coordinates corresponding to the frame interpolation image and the coordinates corresponding to the $M^{th}$ frame when the offset between the coordinates corresponding to the $M^{th}$ frame and the coordinates corresponding to the $(M-1)^{th}$ frame is greater than or equal to the first threshold. In this way, a smaller offset is used for frame interpolation, so that a rule that the interpolated image is inconsistent with the sliding operation can be reduced, to improve smoothness and improve user experience.

Optionally, that the terminal device starts to draw and render a frame interpolation image after the drawing of the $M^{th}$ frame is completed includes: The frame interpolation module determines, based on the down event and a second move event, the offset between the coordinates corresponding to the frame interpolation image and the coordinates corresponding to the $M^{th}$ frame; the frame interpolation module sends the offset between the coordinates corresponding to the frame interpolation image and the coordinates corresponding to the $M^{th}$ frame to a UI thread; and the UI thread draws and renders, after the drawing of the $M^{th}$ frame is completed, the frame interpolation image based on the offset between the coordinates corresponding to the frame interpolation image and the coordinates corresponding to the $M^{th}$ frame.

It may be understood that, the methods shown in FIG. 6 and FIG. 8 may be independently used in the terminal device, or may be combined and simultaneously used in the terminal device.

Figure 9:
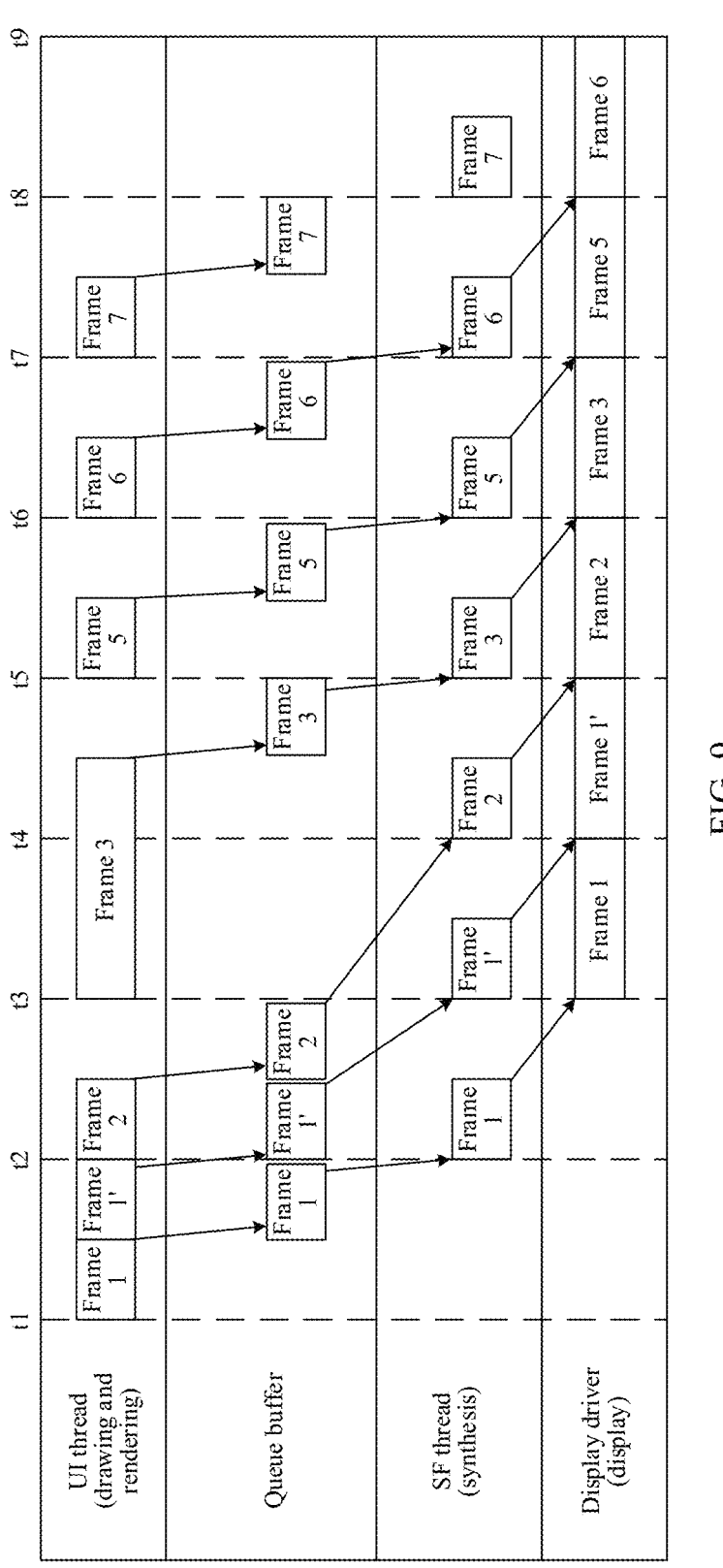
FIG. 9 is a schematic diagram of an interface display processing procedure of a terminal device according to an embodiment of this application.

The data processing method shown in FIG. 8 is described below with reference to FIG. 9 and FIG. 10. For example, FIG. 9 is a schematic diagram of an interface display processing procedure of a terminal device according to an embodiment of this application. A moment t1 to a moment t8 represent an image sequence for the terminal device to perform update based on a sliding operation. A time interval between any two adjacent moments of the moment t1 to the moment t8 is a Vsync periodicity.

As shown in FIG. 9, at the moment t1, a UI thread receives a Vsync 1 signal, and the terminal device reads a move event 1 based on a timestamp of the Vsync 1 signal and starts to draw and render a frame 1 based on coordinates corresponding to the move event 1.

Because an input event read by the terminal device at a moment to is a down event, the terminal device interpolates a move event 1' and draws and renders a frame 1' based on coordinates corresponding to the move event 1'. The UI thread draws and renders the frame 1' after the drawing and the rendering of the frame 1 are completed.

The coordinates corresponding to the move event 1' are a sum of coordinates corresponding to the move event 1 and a first threshold. Alternatively, the coordinates corresponding to the move event 1' are a difference between twice of the coordinates corresponding to the move event 1 and coordinates corresponding to the down event.

In this way, a displacement amount corresponding to the frame 1' is less than or equal to a displacement amount corresponding to the frame 1, thereby reducing a case in which the frame 1' is inconsistent with the sliding operation, so that the frame 1' is more consistent with a rule of the sliding operation, to improve display smoothness.

It may be understood that, the displacement amount corresponding to the frame 1 is a difference between the coordinates corresponding to the move event 1 and the coordinates corresponding to the down event. The displacement amount corresponding to the frame 1' is a difference between the coordinates corresponding to the move event 1' and the coordinates corresponding to the move event 1.

From the moment t1 to a moment t2, the UI thread completes the drawing and the rendering of the frame 1 and the frame 1', and sends a completely drawn and rendered frame 1 and a completely drawn and rendered frame 1' to a queue buffer in an SF thread to wait for synthesis.

At the moment t2, the UI thread receives a Vsync 2 signal, the terminal device reads a move event 2 based on a timestamp of the Vsync 2 signal and starts to draw and render a frame 2 based on coordinates corresponding to the move event 2, and the SF thread starts to synthesize the completely drawn and rendered frame 1.

From the moment t2 to a moment t3, the UI thread completes the drawing and the rendering of the frame 2, and sends a completely drawn and rendered frame 2 to the queue buffer in the SF thread to wait for synthesis.

At the moment t3, the UI thread receives a Vsync 3 signal, the terminal device reads a move event 3 based on a timestamp of the Vsync 3 signal and starts to draw and render a frame 3 based on coordinates corresponding to the move event 3, the SF thread starts to synthesize the completely drawn and rendered frame 1', and a display driver drives a display screen to display a synthesized frame 1.

At a moment t4, the UI thread continues to draw and render the frame 3, the SF thread starts to synthesize the completely drawn and rendered frame 2, and the display driver drives the display screen to display a synthesized frame 1'.

From the moment t4 to a moment t5, the UI thread completes the drawing and the rendering of the frame 3, and sends a completely drawn and rendered frame 3 to the queue buffer in the SF thread to wait for synthesis.

At the moment t5, the UI thread receives a Vsync 5 signal, the terminal device reads a move event 5 based on a timestamp of the Vsync 5 signal and starts to draw and render a frame 5 based on coordinates corresponding to the move event 5, the SF thread starts to synthesize the completely drawn and rendered frame 3, and the display driver drives the display screen to display a synthesized frame 2.

From the moment t5 to a moment t6, the UI thread completes the drawing and the rendering of the frame 5, and sends a completely drawn and rendered frame 5 to the queue buffer in the SF thread to wait for synthesis.

At the moment t6, the UI thread receives a Vsync 6 signal, the terminal device reads a move event 6 based on a timestamp of the Vsync 6 signal and starts to draw and render a frame 6 based on coordinates corresponding to the move event 6, the SF thread starts to synthesize the completely drawn and rendered frame 5 obtained after the drawing and the rendering, and the display driver drives the display screen to display a synthesized frame 3.

From the moment t6 to a moment t7, the UI thread completes the drawing and the rendering of the frame 6, and sends a completely drawn and rendered frame 6 to the queue buffer in the SF thread to wait for synthesis.

At the moment t7, the UI thread receives a Vsync 7 signal, the terminal device reads a move event 7 based on a timestamp of the Vsync 7 signal and starts to draw and render a frame 7 based on coordinates corresponding to the move event 7, the SF thread starts to synthesize the completely drawn and rendered frame 6, and the display driver drives the display screen to display a synthesized frame 5.

From the moment ty to the moment t8, the UI thread completes the drawing and the rendering of the frame 7, and sends a completely drawn and rendered frame 7 to the queue buffer in the SF thread to wait for synthesis.

At the moment t8, the UI thread receives the Vsync 7 signal, the SF thread starts to synthesize the completely drawn and rendered frame 7, and the display driver drives the display screen to display a synthesized frame 6.

It may be understood that, in the processing procedure shown in FIG. 5, when the drawing and the rendering of the frame 3 expire, the frame 2 is displayed for two Vsync periodicities. However, in a processing procedure shown in FIG. 9, when the drawing and the rendering of the frame 3 expire, the frame 2 is displayed for one Vsync periodicity, and display time of the frame 2 is shortened. In the processing procedure shown in FIG. 9, the frame 1' *is* interpolated, and one more frame of image is buffered in the SF thread. When the drawing and the rendering of the frame 3 expire, a case of no frame for the synthesis may be reduced, thereby reducing a display freeze phenomenon and improving the display smoothness.

Figure 10:
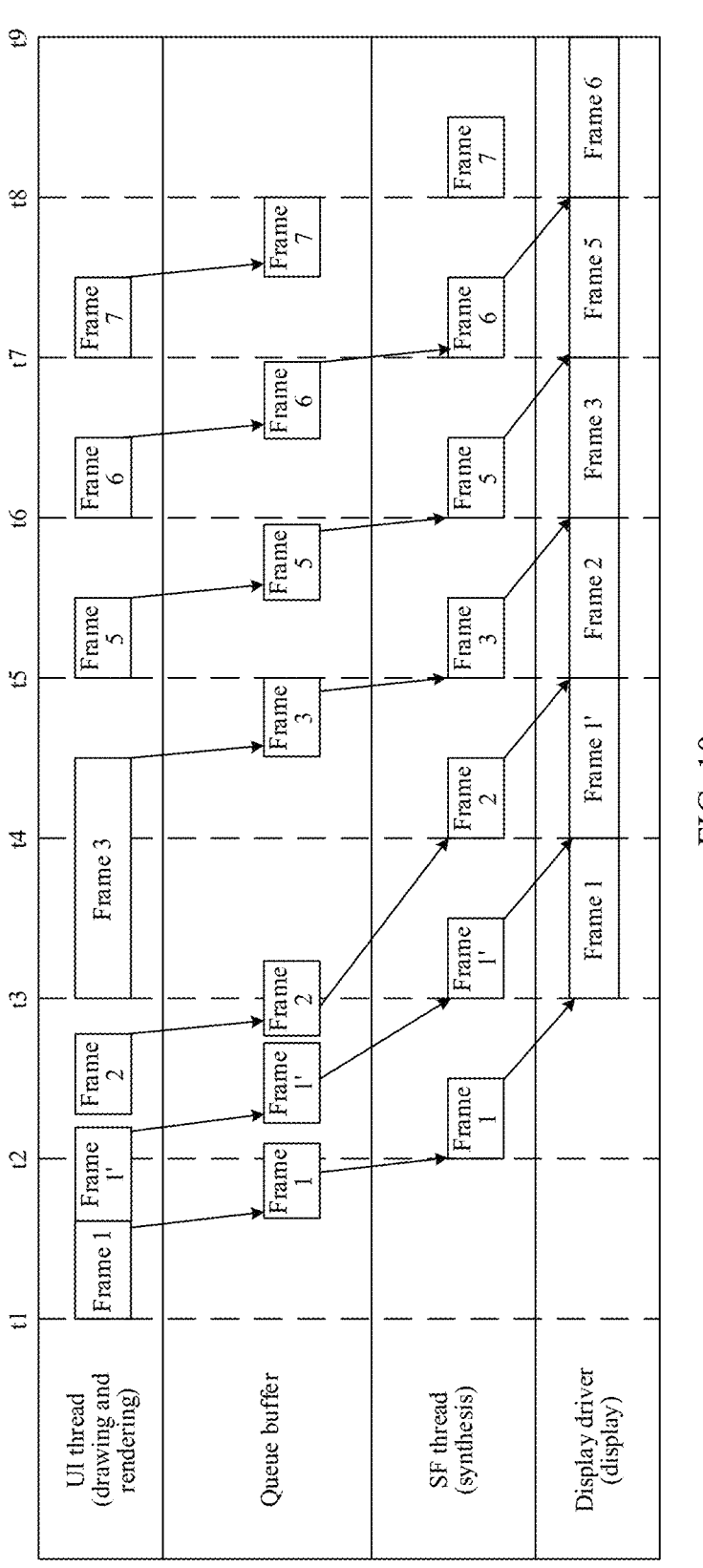
FIG. 10 is a schematic diagram of an interface display processing procedure of a terminal device according to an embodiment of this application.
Figure 11A:
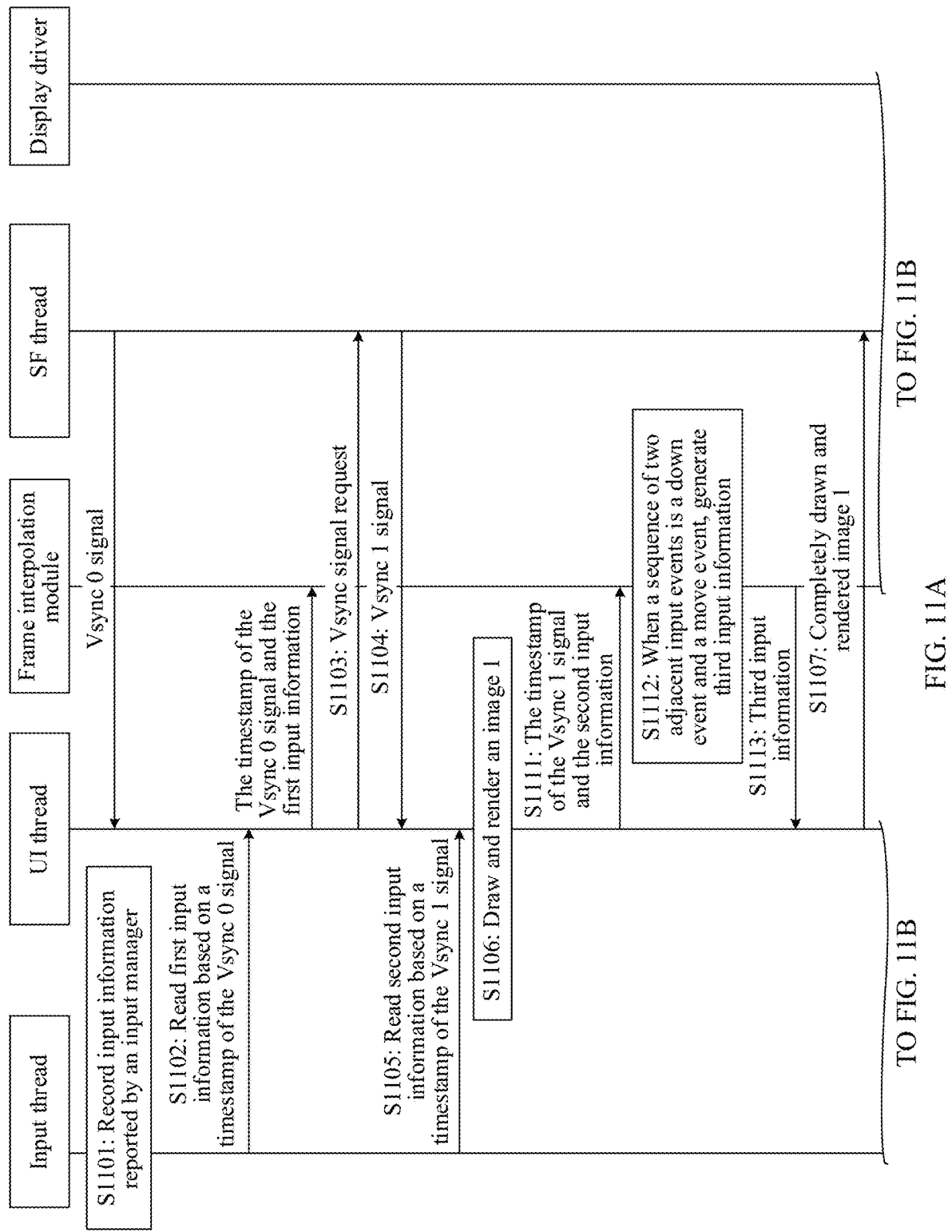
FIG. 11A to FIG. 11D is a schematic diagram of an internal module interaction procedure according to an embodiment of this application.
Figure 11B:
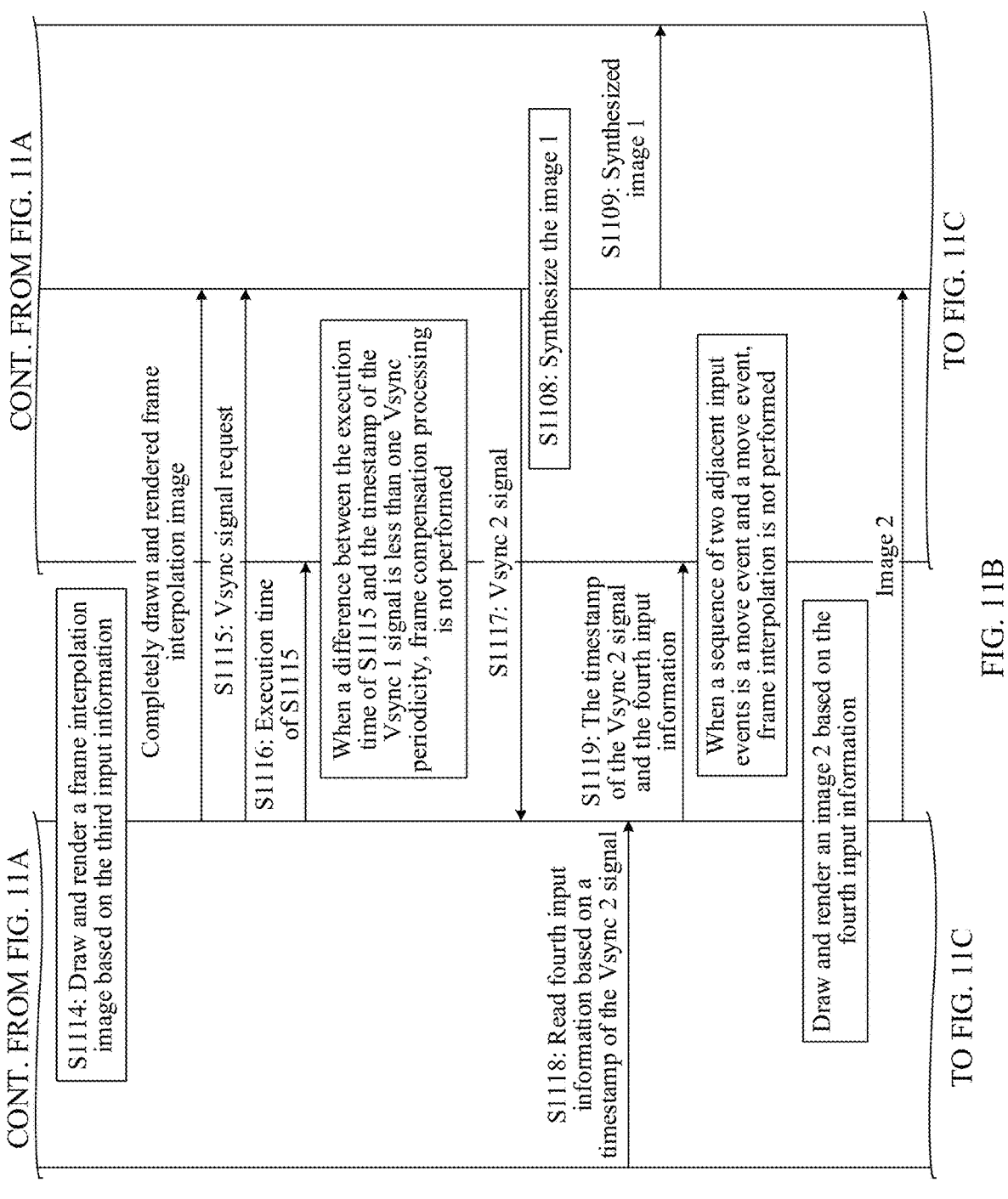
Figure 11C:
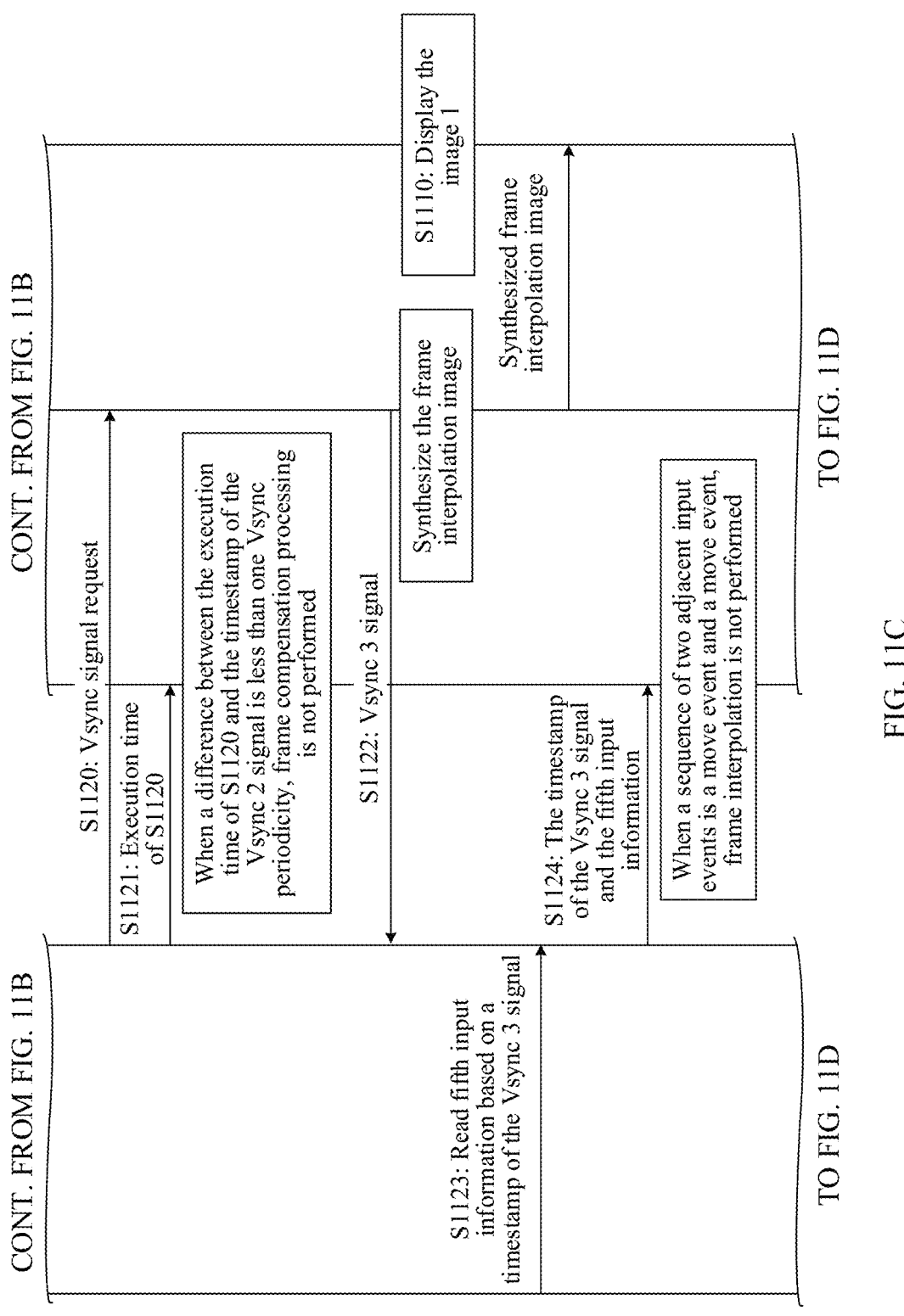
Figure 11D:
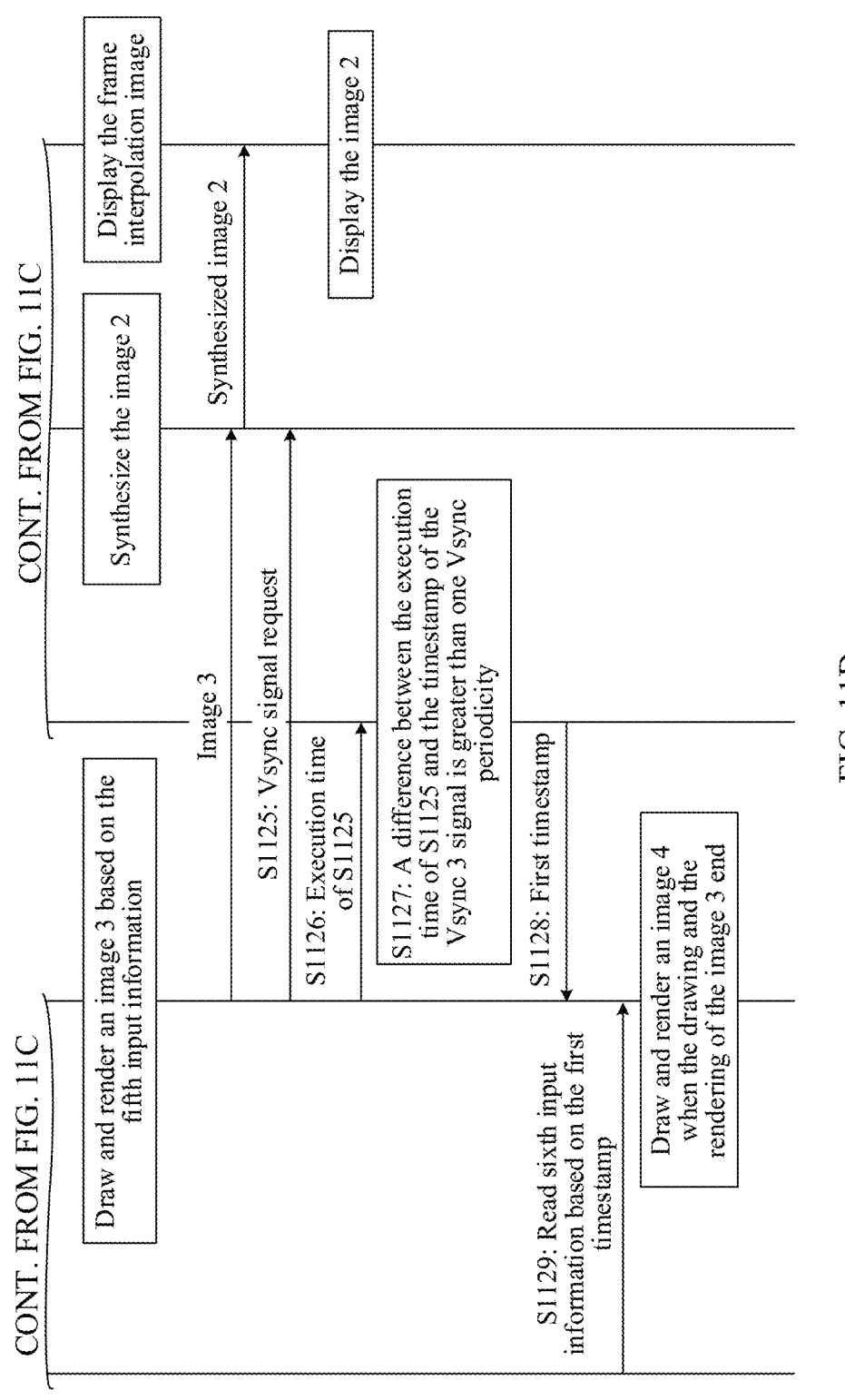

For example, FIG. 10 is a schematic diagram of another interface display processing procedure of a terminal device according to an embodiment of this application. A moment t1 to a moment t8 represent an image sequence for the terminal device to perform update based on a sliding operation. A time interval between any two adjacent moments of the moment t1 to the moment t8 is a Vsync periodicity.

As shown in FIG. 10, at the moment t1, a UI thread receives a Vsync 1 signal, and the terminal device reads a move event 1 based on a timestamp of the Vsync 1 signal and starts to draw and render a frame 1 based on coordinates corresponding to the move event 1.

Because an input event read by the terminal device at a moment to is a press event, the terminal device interpolates a frame 1'. The UI thread draws and renders the frame 1' after the drawing and the rendering of the frame 1 are completed.

From the moment t1 to a moment t2, the UI thread completes the drawing and the rendering of the frame 1, and sends a completely drawn and rendered frame 1 to a queue buffer in an SF thread to wait for synthesis.

At the moment t2, the UI thread continues to draw the frame 1', and the SF thread starts to synthesize the completely drawn and rendered frame 1.

Because the UI thread does not complete the drawing and rendering of the frame 1' at the moment t2, a Vsync 2 signal is missed, the terminal device interpolates a frame 2 through frame compensation and starts to draw and render the frame 2 after the drawing and the rendering of the frame 1' end.

From the moment t2 to a moment t3, the UI thread completes the drawing and the rendering of the frame 1' and the frame 2, and sends a completely drawn and rendered frame 1' and a completely drawn and rendered frame 2 to the queue buffer in the SF thread to wait for synthesis.

During the moment t3 to the moment t8 subsequently, for a display process of the terminal device, refer to the similar procedure during the moment t3 to the moment t8 in FIG. 9. Details are not described herein again.

In comparison with the procedure shown in FIG. 5, in a processing procedure shown in FIG. 10, when drawing and rendering of a frame 3 expire, the frame 2 is displayed for 8.3 ms, and display time of the frame 2 is shortened. In the processing procedure shown in FIG. 10, the frame 1' is interpolated, and one more frame of image is buffered in the SF thread. When the drawing and the rendering of the frame 3 expire, a case of no frame for the synthesis may be reduced, thereby reducing a display freeze phenomenon and improving the display smoothness.

For ease of understanding, an interaction process between modules revolved in the data processing method provided in this embodiment of this application is described below with reference to FIG. 11A to FIG. 11D.

For example, FIG. 11A to FIG. 11D is a schematic diagram of an interaction process among modules in a data processing method according to an embodiment of this application. Involved modules include: an input thread (input thread), a UI thread, a frame interpolation module, an SF (surface flinger) thread, and a display driver. The input thread, the UI thread, and the frame interpolation module are all located at an application layer. The UI thread may also be referred to as a logic thread, or be referred to as an application main thread. The SF thread is located at a framework layer, and the display driver is located at a kernel layer.

The input thread is responsible for recording input information uploaded from an input manager, and determines a user operation type, such as a clicking operation or a sliding operation, based on the input information. The input thread is further responsible for determining, based on a timestamp of a Vsync signal, input information sent to the UI thread.

The UI thread is responsible for receiving and processing various update messages and callbacks for an application. For example, processing of an input event, animation (animation)—related processing, a traversal (traversal) operation, and the like. The traversal operation includes: measuring (measure), a layout (layout), drawing (draw), and the like. The UI thread is further responsible for requesting and receiving the Vsync signal.

S1101: During a sliding operation of a user, the input thread records input information parsed by the input manager. The input information includes, but not limited to, an input event type, coordinates corresponding to the input event, and the like.

It may be understood that, in the sliding operation, a terminal device collects in real time an input event corresponding to a user operation. A frequency at which the terminal device collects the input event may be the same as or may be different from a refresh rate. This is not limited in this embodiment of this application.

S1102: The UI thread reads the input information from the input thread based on a timestamp of a Vsync o signal, and transfers the timestamp of the Vsync o signal and read first input information to the frame interpolation module. The first input information includes a down event and first coordinates.

In this embodiment of this application, the Vsync o signal is a corresponding Vsync signal when the terminal device reads the down event in this sliding operation.

For example, the UI thread sends the timestamp of the Vsync o signal to the input thread. The input thread determines the first input information based on the timestamp of the Vsync o signal, and sends the first input information to the UI thread.

In a possible implementation, the input thread processes the input event within a Vsync periodicity based on the timestamp of the Vsync o signal, to generate the first input information.

S1103: After reading the first input information, the UI thread sends a Vsync signal request to the SF thread, to request a next Vsync signal.

Figure 12:
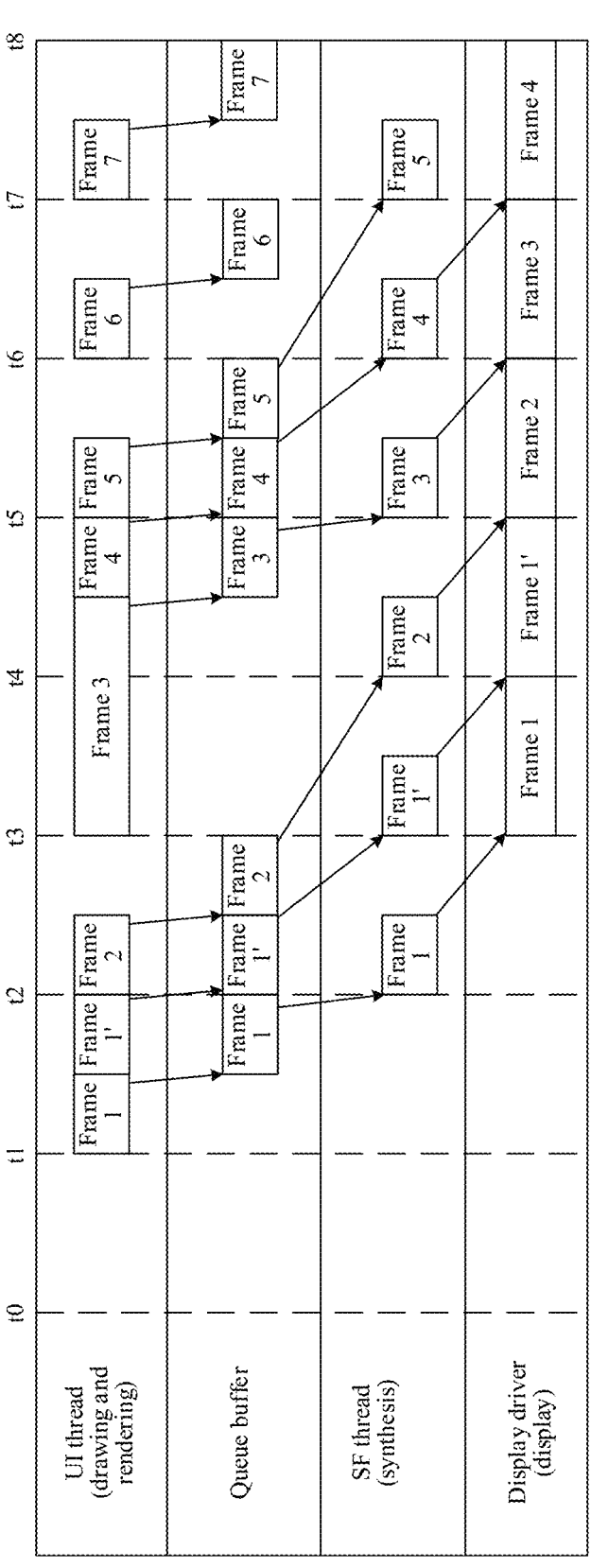
FIG. 12 is a schematic diagram of an interface display processing procedure of a terminal device according to an embodiment of this application.

For example, as shown in FIG. 12, at a moment to, the UI thread receives the Vsync o signal, and the UI thread reads the first input information from the input thread based on the timestamp of the Vsync o signal.

S1104: After timing of a timer ends, the SF thread feeds back a Vsync 1 signal requested in S1103 to the UI thread. In a possible implementation, after receiving the Vsync signal request, the SF thread arranges the timer for sending the Vsync signal. After the timing of the timer ends, the SF thread feeds back the Vsync signal to the UI thread.

S1105: The UI thread reads input information based on a timestamp of the Vsync 1 signal, to obtain second input information.

In this embodiment of this application, the second input information includes a move event and second coordinates. In some embodiments, the second input information further includes an operation type such as the sliding operation.

In a possible implementation 1, the second input information is obtained through calculation based on the timestamp of the Vsync o signal, the timestamp of the Vsync 1 signal, and the recorded input information.

For example, that the UI thread receives the Vsync o signal at the moment to in FIG. 12 is used as an example. If from the moment t0 to a moment t1, the input manager sequentially reports an input event 1, an input event 2, and an input event 3 to the UI thread, when the UI thread receives the Vsync 1 signal at the moment t1, the read second input information is obtained through calculation by the input thread based on input information corresponding to the three input events.

In a possible implementation 2, based on the timestamp of the Vsync 1 signal, input information with latest reading time is the second input information.

For example, that the UI thread receives the Vsync o signal at the moment to in FIG. 12 is used as an example. If from the moment t0 to a moment t1, the input manager sequentially reports an input event 1, an input event 2, and an input event 3 to the UI thread, when the UI thread receives the Vsync 1 signal at the moment t1, input information corresponding to the input event 3 is read as the second input information.

S1106: The UI thread draws and renders an image 1 based on the second input information.

For example, as shown in FIG. 12, at the moment t1, the UI thread receives the Vsync 1 signal, and the UI thread reads the second input information from the input thread based on the timestamp of the Vsync 1 signal. The UI thread starts to draw and render a frame 1 based on the first input information.

In a possible implementation, the UI thread calculates a difference between the second coordinates and the first coordinates, to obtain a first displacement value to determine a layout of the image 1.

S1107: The UI thread sends a drawn and rendered image 1 to the SF thread.

S1108: The SF thread starts to synthesize the image 1 after receiving the drawn and rendered image.

S1109: The SF thread sends a synthesized image 1 to the display driver.

S1110: After receiving the synthesized image, the display driver drives a display screen to display the synthesized image 1.

After performing the foregoing S1105, the terminal device further performs S1111.

S1111: The UI thread sends the timestamp of the Vsync 1 signal and the read second input information to the frame interpolation module.

S1112: After receiving the second input information, the frame interpolation module determines, based on the first input information and the second input information, that a sequence of two adjacent input events is a down event and a move event, and generates third input information.

It may be understood that, the frame interpolation module determines that the sequence of two adjacent input events is the down event and the move event, and determines to interpolate a frame.

In this embodiment of this application, the third input information includes the move event and third coordinates.

In a possible implementation 1, a difference between the third coordinates and the second coordinates is equal to a first threshold.

In a possible implementation 2, a difference between the third coordinates and the second coordinates satisfies being equal to the first displacement value, and the first displacement value is the difference between the second coordinates and the first coordinates.

In a possible implementation 3, a difference between the third coordinates and the second coordinates is a minimum value between a first threshold and the first displacement value.

S1113: The frame interpolation module sends the third input information to the UI thread.

S1114: After the drawing and the rendering of the image 1 end, the UI thread draws and renders a frame interpolation image based on the third input information.

It may be understood that, the UI thread sends a drawn and rendered frame interpolation image to the SF thread. The SF thread starts to synthesize the frame interpolation image after receiving the drawn and rendered frame interpolation image. The SF thread sends a synthesized frame interpolation image to the display driver. The display driver drives the display screen to display the frame interpolation image.

For example, as shown in FIG. 12, at the moment t1, the UI thread receives the Vsync 1 signal and starts to draw and render the frame 1. From the moment t1 to a moment t2, the terminal device determines that the two adjacent input events are the down event and the move event, and generates the third input information. The UI thread starts to draw and render a frame 1' based on the third input information after the drawing and the rendering of the frame 1 are completed.

S1115: The UI thread sends a Vsync signal request to the SF thread, to request a next Vsync signal.

In some embodiments, the UI thread sends the Vsync signal request during the drawing of the frame 1. In some other embodiments, the UI thread sends the Vsync signal request during the drawing of the frame 1'. Specific time of sending the Vsync signal request is not limited in this embodiment of this application.

S1116: When sending the Vsync signal request, the UI thread sends execution time of S1115 to the frame interpolation module.

When a difference based on the execution time of S1115 and the timestamp of Vsync 1 is less than or equal to the Vsync periodicity, the frame interpolation module does not perform frame interpolation processing. When the difference based on the execution time of S1115 and the timestamp of the Vsync 1 is greater than the Vsync periodicity, the frame interpolation module performs the frame interpolation processing. For a specific procedure of the frame interpolation processing, refer to the following S1127 to S1129. Details are not described herein again.

S1117: After the timing of the timer ends, the SF thread feeds back a Vsync 2 signal requested in S1115 to the UI thread.

For example, as shown in FIG. 12, at a moment t3, the UI thread receives the Vsync 2 signal and starts to draw and render a frame 2.

S1118: After receiving the Vsync 2 signal, the UI thread reads input information from the input thread based on a timestamp of the Vsync 2 signal, to obtain fourth input information.

In this embodiment of this application, the fourth input information includes the move event and fourth coordinates.

In a possible implementation 1, the fourth input information is obtained through calculation based on the timestamp of the Vsync 1 signal, the timestamp of the Vsync 2 signal, and the recorded input information.

In a possible implementation 2, based on the timestamp of the Vsync 2 signal, input information with latest reading time is the fourth input information.

Adaptively, the terminal device performs drawing and rendering, synthesis, and display based on the fourth input information. Details are not described herein. For a specific process, refer to the foregoing S1106 to S1110. Details are not described herein again.

S1119: The UI thread sends the timestamp of the Vsync 2 signal and the fourth input information to the frame interpolation module.

It may be understood that, because two pieces of adjacent input events are a move event and a move event, frame interpolation is not performed.

S1120: The UI thread sends a Vsync signal request to the SF thread.

S1121: The UI thread sends execution time of S1120 to the frame interpolation module.

When a difference based on the execution time of S1120 and the timestamp of Vsync 2 is less than or equal to the Vsync periodicity, the frame interpolation module does not perform frame interpolation processing. When the difference based on the execution time of S1120 and the timestamp of the Vsync 2 is greater than the Vsync periodicity, the frame interpolation module performs the frame interpolation processing. A specific procedure of the frame interpolation processing is similar to the following S1127 to S1129. Details are not described herein again.

S1122: After the timing of the timer ends, the SF thread feeds back a Vsync 3 signal requested in S1120 to the UI thread.

S1123: After receiving the Vsync 3 signal, the UI thread reads input information from the input thread based on a timestamp of the Vsync 3 signal, to obtain fifth input information.

In this embodiment of this application, the fifth input information includes the move event and fifth coordinates.

In a possible implementation 1, the fifth input information is obtained through calculation based on the timestamp of the Vsync 2 signal, the timestamp of the Vsync 3 signal, and the recorded input information.

In a possible implementation 2, based on the timestamp of the Vsync 3 signal, input information with latest reading time is the fourth input information.

Adaptively, the terminal device performs drawing and rendering, synthesis, and display of an image 3 based on the fifth input information. Details are not described herein. For a specific process, refer to the foregoing S1106 to S1110. Details are not described herein again.

S1124: The UI thread sends the timestamp of the Vsync 3 signal to the frame interpolation module and transfers the read fifth input information to the frame interpolation module.

It may be understood that, because two pieces of adjacent input events are a move event and a move event, frame interpolation is not performed.

S1125: The UI thread sends a Vsync signal request to the SF thread.

S1126: The UI thread sends execution time of S1125 to the frame interpolation module.

When a difference based on the execution time of S1125 and the timestamp of Vsync 3 is less than or equal to the Vsync periodicity, the frame interpolation module does not perform frame interpolation processing. When the difference based on the execution time of S1125 and the timestamp of the Vsync 3 is greater than the Vsync periodicity, the frame interpolation module performs the frame interpolation processing. A specific procedure of the frame interpolation processing is similar to the following S1127 to S1129. Details are not described herein again.

S1127: The frame interpolation module determines that the difference between the execution time of S1125 and the timestamp of the Vsync 3 is greater than the Vsync periodicity, and performs the frame interpolation processing.

In some embodiments, the frame interpolation module sends a first timestamp to the UI thread. The UI thread reads sixth input information from the input thread based on the first timestamp.

The first timestamp is a timestamp between the execution time of S1125 and the timestamp of the Vsync 3 signal.

In a possible implementation 1, the first timestamp is a sum of the timestamp of the Vsync 3 signal and one Vsync periodicity.

For example, that a screen refresh rate is 120 Hz is used as an example. If the timestamp of the Vsync 3 signal is 24.9 ms, the first timestamp is 24.9 ms+8.3 ms, to be specific, 33.2 ms.

In a possible implementation 2, the first timestamp is a sum of the timestamp of the Vsync 3 signal and A Vsync periodicities, where A is an integer value of $$\frac{\text{execution time of } S1125 - \text{timestamp of the } Vsync \text{ 3 signal}}{Vsync \text{ periodicity}}.$$

For example, that the screen refresh rate is 120 Hz is used as an example. If the performing time of S1125 is 33.6 ms, and the timestamp of the Vsync 3 signal is 24.9 ms, A is 1, and the first timestamp is 24.9 ms+8.3 ms, to be specific, 33.2 ms.

For example, that the screen refresh rate is 120 Hz is used as an example. If the execution time of S1125 is 42 ms, and the timestamp of the Vsync 3 signal is 24.9 ms, A is 2, and the first timestamp is 24.9 ms+8.3 ms+8.3 ms, to be specific, 41.5 ms.

It may be understood that, other than the foregoing two methods, the frame interpolation module may also have other methods for determining the first timestamp. This is not limited in this embodiment of this application.

In this embodiment of this application, the sixth input information includes the move event and sixth coordinates. A difference between the sixth coordinates and the fifth coordinates is equal to four displacement values. The fourth displacement value is a difference between the fifth coordinates in the fifth input information and the fourth coordinates in the fourth input information.

In some other embodiments, the frame interpolation module reads the sixth input information from the input thread based on the first timestamp. The frame interpolation module sends the sixth input information to the UI thread.

S1128: The frame interpolation module sends the first timestamp to the UI thread.

S1129: The UI thread reads the sixth input information from the input thread based on the first timestamp. In addition, the UI thread draws and renders an image 4 based on the sixth input information when the drawing and the rendering of the image 3 are completed.

Adaptively, the terminal device performs drawing and rendering, synthesis, and display of the image 3 based on the fifth input information. The terminal device performs drawing and rendering, synthesis, and display of the image 4 based on the sixth input information. Details are not described herein. For a specific process, refer to the foregoing S1106 to S1110.

For example, as shown in FIG. 12, between a moment t4 and a moment t5, because a difference between time of sending the Vsync signal request by the UI thread and the moment t4 is greater than one Vsync periodicity, the terminal device interpolates a frame 4 through frame compensation and starts to draw and render the frame 4 when drawing and rendering of a frame 3 end.

In this way, at an initial stage of the sliding operation, a frame is interpolated in advance for drawing and rendering, so that one more frame is buffered in a queue buffer. Therefore, a case in which no frame is for synthesis and that is caused by subsequent expiration of drawing and rendering is reduced, to reduce a display freeze and improve user experience. When the drawing and the rendering expire, a frame of image is interpolated through frame compensation, to reduce a lost frame caused by a missed Vsync signal due to the expiration of drawing and rendering, and improve display smoothness.

It is to be noted that, the drawing and the rendering of the image include a plurality of steps such as measuring (measure), a layout (layout), and drawing (draw). The UI thread may send the Vsync signal request to the SF thread when the drawing and the rendering of the image end. The UI thread may also send the Vsync signal request to the SF thread when any step of the measuring (measure), the layout (layout), and the drawing (draw) ends. A trigger condition of sending the Vsync signal request by the UI thread is not specifically limited in this embodiment of this application.

The foregoing procedure shown in FIG. 11A to FIG. 11D is described below with reference to FIG. 12. For example, FIG. 12 is a schematic diagram of an interface display processing procedure of a terminal device according to an embodiment of this application. A moment t0 to a moment ty represent an image sequence for the terminal device to perform update based on a sliding operation. A time interval between any two adjacent moments of the moment t1 to the moment t7 is a Vsync periodicity.

As shown in FIG. 12, at a moment to, a UI thread receives a Vsync o signal, and the UI thread reads first input information based on a timestamp of the Vsync o signal.

At the moment t1, the UI thread receives a Vsync 1 signal, and the UI thread reads second input information based on a timestamp of the Vsync 1 signal and starts to draw and render a frame 1. In addition, at the moment t1, the terminal device determines that two adjacent input events are a down event and a move event, and generates third input information. The UI thread draws and renders a frame 1' based on the third input information after the drawing and the rendering of the frame 1 are completed.

In a possible implementation, a displacement amount corresponding to the frame 1' is less than or equal to a displacement amount corresponding to the frame 1. The displacement amount corresponding to the frame 1 is a difference between second coordinates corresponding to the second input information and first coordinates corresponding to the first input information. The displacement amount corresponding to the frame 1' is a difference between third coordinates corresponding to the third input information and the second coordinates.

From the moment t1 to a moment t2, the UI thread completes the drawing and the rendering of the frame 1 and the frame 1', and sends a completely drawn and rendered frame 1 and a completely drawn and rendered frame 1' to a queue buffer in an SF thread to wait for synthesis.

At the moment t2, the UI thread receives a Vsync 2 signal, the terminal device reads fourth input information based on a timestamp of the Vsync 2 signal and starts to draw and render a frame 2 based on fourth coordinates in the fourth input information, and the SF thread starts to synthesize the completely drawn and rendered frame 1. In addition, at the moment t2, the terminal device determines that two adjacent input events are a move event and a move event, and frame interpolation is not performed. From the moment t2 to a moment t3, the UI thread completes the drawing and the rendering of the frame 2, and sends a completely drawn and rendered frame 2 to the queue buffer in the SF thread to wait for synthesis.

At the moment t3, the UI thread receives a Vsync 3 signal, the terminal device reads fifth input information based on a timestamp of the Vsync 3 signal and starts to draw and render a frame 3 based on fifth coordinates in the fifth input information, the SF thread starts to synthesize the completely drawn and rendered frame 1', and a display driver drives a display screen to display a synthesized frame 1. In addition, at the moment t3, the terminal device determines that two adjacent input events are a move event and a move event, and frame interpolation is not performed.

At a moment t4, the UI thread continues to draw and render the frame 3, the SF thread starts to synthesize the completely drawn and rendered frame 2, and the display driver drives the display screen to display a synthesized frame 1'. In addition, at the moment t4, the terminal device determines that two adjacent input events are a move event and a move event, and frame interpolation is not performed.

Because a difference between time of sending the Vsync signal request by the UI thread and the moment t4 is greater than one Vsync periodicity, the terminal device interpolates a frame 4 through frame interpolation and starts to draw and render the frame 4 when the drawing and the rendering of the frame 3 end.

From the moment t4 to a moment t5, the drawing and the rendering of the frame 3 and the frame 4 are completed, and a completely drawn and rendered frame 3 and a completely drawn and rendered frame 4 are sent to the queue buffer in the SF thread to wait for synthesis.

At the moment t5, the UI thread receives a Vsync 5 signal, the terminal device reads the fifth input information based on a timestamp of the Vsync 5 signal and starts to draw and render a frame 5 based on the coordinates in the fifth input information, the SF thread starts to synthesize the completely drawn and rendered frame 3, and the display driver drives the display screen to display a synthesized frame 2. In addition, at the moment t5, the terminal device determines that two adjacent input events are a move event and a move event, and frame interpolation is not performed. From the moment t5 to a moment t6, the UI thread completes the drawing and the rendering of the frame 5, and sends the frame 5 to the queue buffer in the SF thread to wait for synthesis.

At the moment t6, the UI thread receives a Vsync 6 signal, the terminal device reads sixth input information based on a timestamp of the Vsync 6 signal and starts to draw and render a frame 6 based on coordinates in the sixth input information, the SF thread starts to synthesize the completely drawn and rendered frame 5, and the display driver drives the display screen to display a synthesized frame 3. In addition, at the moment t6, the terminal device determines that two adjacent input events are a move event and a move event, and frame interpolation is not performed. From the moment t6 to a moment t7, the UI thread completes the drawing and the rendering of the frame 6, and sends a completely drawn and rendered frame 6 to the queue buffer in the SF thread to wait for synthesis.

At the moment t7, the UI thread receives a Vsync 7 signal, the terminal device reads seventh input information based on a timestamp of the Vsync 7 signal and starts to draw and render a frame 7 based on coordinates in the seventh input information, the SF thread starts to synthesize the completely drawn and rendered frame 6, and the display driver drives the display screen to display a synthesized frame 4.

From the moment ty to a moment t8, the UI thread completes the drawing and the rendering of the frame 7, and sends a completely drawn and rendered frame 7 to the queue buffer in the SF thread to wait for synthesis. At the moment t8, the UI thread receives the Vsync 7 signal, the SF thread starts to synthesize the completely drawn and rendered frame 7, and the display driver drives the display screen to display a synthesized frame 4.

In comparison with the processing procedure in FIG. 5, in the processing procedure shown in FIG. 12, the frame 1' is interpolated, and one more frame of image is buffered in the SF thread. When the drawing and the rendering of the frame 3 expire, a case of no frame for the synthesis may be reduced, thereby reducing a display freeze phenomenon and improving display smoothness. In addition, in the processing procedure shown in FIG. 12, the frame 4 is interpolated through frame compensation when the drawing and the rendering of the frame 3 exceeds one Vsync periodicity. The frame 4 is further displayed before the frame 5 is displayed, so that a case in which displaying jumps from the frame 3 to the frame 5 is reduced, and the display smoothness is improved.

It is to be noted that, in this embodiment of this application, "when . . . " may be an instantaneous occurrence time of a case, or may be a period of time after occurrence of a case, which is not specifically limited in this embodiment of this application. In addition, the display interface provided in this embodiment of this application is merely used as an example, and the display interface may also include more or less content.

The foregoing describes the data processing method in the embodiments of this application. The following describes an apparatus for performing the data processing method provided in the embodiments of this application. It may be understood by a person skilled in the art that the method and the apparatus can be combined with or refer to each other. The related apparatus provided in this embodiment of this application can perform the steps of the foregoing data processing method.

Figure 13:
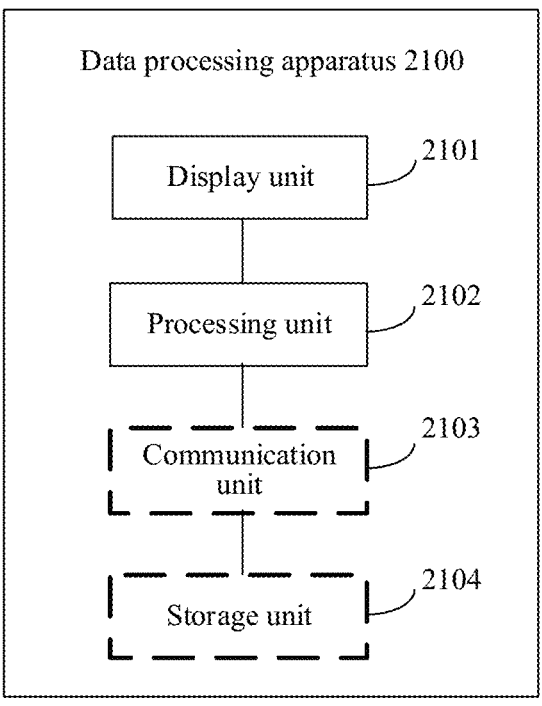
FIG. 13 is a schematic diagram of a structure of a data processing apparatus according to an embodiment of this application.

FIG. 13 is a schematic diagram of a structure of a data processing apparatus according to an embodiment of this application. The data processing apparatus may be a terminal device in this embodiment of this application, or may be a chip or a chip system in the terminal device.

As shown in FIG. 13, a data processing apparatus 2100 may be used in a communication device, a circuit, a hardware component, or a chip, and the data processing apparatus includes: a display unit 2101 and a processing unit 2102. The display unit 2101 is configured to support display steps performed by the data processing apparatus 2100. The processing unit 2102 is configured to support information processing steps performed by the data processing apparatus 2100.

In a possible implementation, the data processing apparatus 2100 may further include a communication unit 2103. Specifically, the communication unit is configured to support data sending steps and data receiving steps that are performed by the data processing apparatus 2100. The communication unit 2103 may be an input or output interface, a pin, a circuit, or the like.

In a possible embodiment, the data processing apparatus may further include: a storage unit 2104. The processing unit 2102 is connected to the storage unit 2104 through a bus. The storage unit 2104 may include one or more memories, and the memory may be one or more devices or components in a circuit that are used to store a program or data. The storage unit 2104 may exist independently, and is connected to the processing unit 2102 included by the data processing apparatus by using a communication line. The storage unit 2104 may alternatively be integrated with the processing unit 2102.

The storage unit 2104 may store computer-executable instructions of the method of the terminal device, so that the processing unit 2102 performs the method in the foregoing embodiments. The storage unit 2104 may be a register, a cache, a RAM, or the like, and the storage unit 2104 may be integrated with the processing unit 2102. The storage unit 2104 may be a read-only memory (read-only memory, ROM) or another type of static storage device that may store static information and instructions, and the storage unit 2104 may be independent of the processing unit 2102.

The data processing method provided in the embodiments of this application may be applied to an electronic device that has a display function. The electronic device includes the terminal device. For a specific device form and the like of the terminal device, refer to the foregoing related descriptions, and details are not described herein again.

An embodiment of this application provides a terminal device, including: a processor and a memory. The memory stores computer-executable instructions. The processor executes computer-executable instructions stored in the memory, to enable the terminal device to perform the foregoing method.

An embodiment of this application provides a chip. The chip includes a processor, and the processor is configured to invoke a computer program in a memory, to perform the technical solutions in the foregoing embodiments. Their implementation principles and technical effects are similar those in the related embodiments, and details are not described herein again.

An embodiment of this application further provides a computer-readable storage medium. The computer-readable storage medium stores a computer program. When the computer program is executed by a processor, the foregoing method is implemented. The method described in the foregoing embodiments may be fully or partially implemented by software, hardware, firmware, or any combination thereof. If implemented in software, a function may be stored on or transmitted on a computer readable medium as one or more instructions or code. The computer-readable medium may include a computer storage medium and a communication medium, and may further include any medium that can transmit the computer program from one place to another. The storage medium may be any target medium accessible to a computer.

In a possible implementation, the computer-readable medium may include a RAM, a ROM, a compact disc read-only memory (compact disc read-only memory, CD-ROM) or another optical disk memory, a magnetic disk memory or another magnetic storage device, or any other medium that is to carry or store required program code in a form of instructions or a data structure, and may be accessed by the computer. Furthermore, any connection is appropriately referred to as a computer-readable medium. For example, if software is transmitted from a website, a server or another remote source by using a coaxial cable, an optical fiber cable, a twisted pair, a digital subscriber line (Digital Subscriber Line, DSL) or wireless technologies (such as infrared ray, radio, and microwave), the coaxial cable, optical fiber cable, twisted pair, DSL or wireless technologies such as infrared ray, radio, and microwave are included in the definition of the medium. A magnetic disk and an optical disc used herein include an optical disc, a laser disc, an optical disc, a digital versatile disc (Digital Versatile Disc, DVD), a floppy disk, and a blue ray disc, where the magnetic disk generally reproduces data in a magnetic manner, and the optical disc reproduces data optically by using laser. The foregoing combination should also be included in the scope of the computer-readable medium.

An embodiment of this application provides a computer program product, including a computer program. When the computer program is run, a computer is enabled to perform the foregoing method.

The embodiments of this application are described with reference to the flowcharts and/or block diagrams of the method, the device (system), and the computer program product according to the embodiments of this application. It should be understood that, computer program instructions may be used to implement each process and/or block in the flowcharts and/or the block diagrams, and a combination of a process and/or a block in the flowcharts and/or the block diagrams. These computer program instructions may be provided for a general-purpose computer, a dedicated computer, an embedded processor, or a processing unit of any other programmable device to generate a machine, so that the instructions executed by a computer or a processing unit of any other programmable data processing device generate an apparatus for implementing a specific function in one or more processes in the flowcharts and/or in one or more blocks in the block diagrams.

The foregoing specific implementations further describe the objectives, technical solutions in detail, and beneficial effects of this application. It should be appreciated that the foregoing descriptions are merely specific implementations of this application, but are not intended to limit the protection scope of this application. Any modification, equivalent replacement, or improvement made based on the technical solutions of this application should fall within the protection scope of this application.

The invention claimed is:

1. A data processing method, comprising:

in response to a sliding operation, obtaining, by a terminal device, an input event corresponding to the sliding operation;

drawing and rendering, by the terminal device, an $N^{th}$ frame based on a first move event, wherein the first move event is extracted based on a timestamp of a first Vsync signal and from the input event corresponding to the sliding operation;

displaying, by the terminal device, the $N^{th}$ frame;

drawing and rendering, by the terminal device when duration of the drawing and the rendering of the $N^{th}$ frame is greater than a Vsync periodicity, an $(N+1)^{th}$ frame based on a second move event after the drawing and the rendering of the $N^{th}$ frame are completed, wherein the second move event is extracted based on a first timestamp and from the input event corresponding to the sliding operation, and the first timestamp is a sum of the timestamp of the first Vsync signal and the Vsync periodicity; and displaying, by the terminal device, the $(N+1)^{th}$ frame.

2. The method according to claim 1, wherein the drawing and rendering, by the terminal device when duration of the drawing and the rendering of the $N^{th}$ frame is greater than a Vsync periodicity, an $(N+1)^{th}$ frame based on a second move event after the drawing and the rendering of the $N^{th}$ frame are completed comprises:

sending, by a UI thread of the terminal device, a Vsync signal request to an SF thread of the terminal device at a first moment, wherein the first moment is later than the timestamp of the first Vsync signal; and drawing and rendering, by the terminal device when a first value is greater than the Vsync periodicity, the $(N+1)^{th}$ frame based on the second move event after the drawing and the rendering of the $N^{th}$ frame are completed, wherein the first value is a difference of the first moment and the timestamp of the first Vsync signal.

3. The method according to claim 2, wherein the drawing and rendering, by the terminal device when a first value is greater than the Vsync periodicity, the $(N+1)^{th}$ frame based on the second move event after the drawing of the $N^{th}$ frame is completed comprises:

sending, by a frame interpolation module of the terminal device, the first timestamp to the UI thread when the first value is greater than the Vsync periodicity;

reading, by the UI thread, the second move event from an input thread of the terminal device based on the first timestamp; and drawing and rendering, by the UI thread after the drawing and the rendering of the $N^{th}$ frame are completed, the $(N+1)^{th}$ frame based on the second move event.

4. The method according to claim 2, wherein the drawing and rendering, by the terminal device when a first value is greater than the Vsync periodicity, the $(N+1)^{th}$ frame based on the second move event when the drawing of the $N^{th}$ frame is completed comprises:

reading, by a frame interpolation module of the terminal device when the first value is greater than the Vsync periodicity, the second move event from an input thread of the terminal device based on the first timestamp;

sending, by the frame interpolation module, the second move event to the UI thread; and drawing and rendering, by the UI thread after the drawing of the $N^{th}$ frame is completed, the $(N+1)^{th}$ frame based on the second move event.

5. The method according to claim 1, wherein the method further comprises:

an input event determined by the terminal device based on a timestamp of a second Vsync signal being a down event, wherein the timestamp of the second Vsync signal is earlier than the timestamp of the first Vsync signal;

drawing and rendering, by the terminal device, an $M^{th}$ frame based on a third move event, wherein the third move event is extracted based on a timestamp of a third Vsync signal and from the input event corresponding to the sliding operation, the timestamp of the third Vsync signal is one Vsync periodicity later than the timestamp of the second Vsync signal, and the timestamp of the third Vsync signal is earlier than or equal to the timestamp of the first Vsync signal;

displaying, by the terminal device, the $M^{th}$ frame;

drawing and rendering, by the terminal device, a frame interpolation image after the drawing of the $M^{th}$ frame is completed, wherein an offset between coordinates corresponding to the frame interpolation image and coordinates corresponding to the $M^{th}$ frame is less than or equal to a second value, and the second value is an offset between the coordinates corresponding to the $M^{th}$ frame and coordinates corresponding to an $(M-1)^{th}$ frame; and displaying, by the terminal device, the frame interpolation image.

6. The method according to claim 5, wherein the offset between the coordinates corresponding to the frame interpolation image and the coordinates corresponding to the $M^{th}$ frame is equal to the second value when the offset between the coordinates corresponding to the $M^{th}$ frame and the coordinates corresponding to the $(M-1)^{th}$ frame is less than a first threshold; or the offset between the coordinates corresponding to the frame interpolation image and the coordinates corresponding to the Mth frame is equal to the first threshold when the offset between the coordinates corresponding to the $M^{th}$ frame and the coordinates corresponding to the $(M-1)^{th}$ frame is greater than or equal to the first threshold.

7. The method according to claim 5, wherein the drawing and rendering, by the terminal device, a frame interpolation image after the drawing of the $M^{th}$ frame is completed comprises:

determining, by the frame interpolation module based on the down event and the second move event, the offset between the coordinates corresponding to the frame interpolation image and the coordinates corresponding to the $M^{th}$ frame;

sending, by the frame interpolation module, the offset between the coordinates corresponding to the frame interpolation image and the coordinates corresponding to the $M^{th}$ frame to the UI thread; and drawing and rendering, by the UI thread after the drawing of the $M^{th}$ frame is completed, the frame interpolation image based on the offset between the coordinates corresponding to the frame interpolation image and the coordinates corresponding to the $M^{th}$ frame.

8. An electronic device, comprising:

one or more processors;

one or more memories; and a module at which a plurality of applications are installed, wherein the memory stores one or more programs, and when the one or more programs are executed by the processor, the electronic device is enabled to perform the following steps:

in response to the sliding operation, obtaining, by a terminal device, an input event corresponding to the sliding operation;

drawing and rendering, by the terminal device, an $N^{th}$ frame based on a first move event, wherein the first move event is extracted based on a timestamp of a first Vsync signal and from the input event corresponding to the sliding operation;

displaying, by the terminal device, the $N^{th}$ frame;

drawing and rendering, by the terminal device when duration of the drawing and the rendering of the $N^{th}$ frame is greater than a Vsync periodicity, an $(N+1)^{th}$ frame based on a second move event after the drawing and the rendering of the $N^{th}$ frame are completed, wherein the second move event is extracted based on a first timestamp and from the input event corresponding to the sliding operation, and the first timestamp is a sum of the timestamp of the first Vsync signal and the Vsync periodicity; and displaying, by the terminal device, the $(N+1)^{th}$ frame.

9. A non-transitory computer-readable storage medium, comprising a computer program, which when executed by a processor, cause the processor to perform operations comprising:

in response to the sliding operation, obtaining, by a terminal device, an input event corresponding to the sliding operation;

drawing and rendering, by the terminal device, an $N^{th}$ frame based on a first move event, wherein the first move event is extracted based on a timestamp of a first Vsync signal and from the input event corresponding to the sliding operation;

displaying, by the terminal device, the $N^{th}$ frame;

drawing and rendering, by the terminal device when duration of the drawing and the rendering of the $N^{th}$ frame is greater than a Vsync periodicity, an $(N+1)^{th}$ frame based on a second move event after the drawing and the rendering of the $N^{th}$ frame are completed, wherein the second move event is extracted based on a first timestamp and from the input event corresponding to the sliding operation, and the first timestamp is a sum of the timestamp of the first Vsync signal and the Vsync periodicity; and displaying, by the terminal device, the $(N+1)^{th}$ frame.

* * * * *